(12) United States Patent
Malladi et al.

(10) Patent No.: US 8,300,533 B2
(45) Date of Patent: Oct. 30, 2012

(54) UPLINK PILOT MULTIPLEXING IN SINGLE USER MIMO AND SDMA FOR SINGLE CARRIER FREQUENCY DIVISION MULTIPLE ACCESS SYSTEMS

(75) Inventors: Durga Prasad Malladi, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 12/440,586

(22) PCT Filed: Oct. 5, 2007

(86) PCT No.: PCT/US2007/080560
§ 371 (c)(1),
(2), (4) Date: Sep. 8, 2009

(87) PCT Pub. No.: WO2008/045781
PCT Pub. Date: Apr. 17, 2008

(65) Prior Publication Data
US 2009/0316675 A1    Dec. 24, 2009

Related U.S. Application Data

(60) Provisional application No. 60/850,942, filed on Oct. 10, 2006.

(51) Int. Cl.
*G01R 31/08* (2006.01)
*H04J 1/00* (2006.01)
(52) U.S. Cl. ........................................ 370/235; 370/343

(58) Field of Classification Search .................... None
See application file for complete search history.

(56) References Cited

U.S. PATENT DOCUMENTS

| | | | |
|---|---|---|---|
| 2004/0081123 A1 | 4/2004 | Krishnan et al. | |
| 2005/0215251 A1 | 9/2005 | Krishnan et al. | |
| 2007/0258373 A1* | 11/2007 | Frederiksen et al. | 370/235 |
| 2007/0293172 A1* | 12/2007 | Shi et al. | 455/187.1 |
| 2010/0142364 A1* | 6/2010 | Sahlman | 370/210 |

FOREIGN PATENT DOCUMENTS

| | | |
|---|---|---|
| JP | 2004080110 A | 3/2004 |
| KR | 20050092063 A | 9/2005 |
| RU | 2005116255 | 11/2005 |
| RU | 2006125045 | 1/2006 |

OTHER PUBLICATIONS

NTT Docomo: "Channel-dependent packet scheduling for Single-Carrier FDMA in evolved UTRA Uplink" TSG-RAN WG1 #43, (Online) Nov. 7, 2005, pp. 1-8, XP002465080.

(Continued)

*Primary Examiner* — John Blanton
(74) *Attorney, Agent, or Firm* — Liem T. Do

(57) ABSTRACT

Systems and methodologies are described that facilitate adaptive uplink pilot multiplexing schemes. In various embodiments, frequency position and pilot channel bandwidth can be adaptively varied in a block over time based on the uplink channel data, such as the number of streams to be multiplexed. Thus, the provided adaptive uplink pilot multiplexing schemes provide flexible uplink pilot allocation schemes while maintaining single carrier waveform for improved transmit power efficiency and orthogonality of pilots within blocks for improve channel estimation and suppression of interference.

35 Claims, 16 Drawing Sheets

OTHER PUBLICATIONS

Ofuji Y. et al: "Frequency domain channel dependent scheduling employing an adaptive transmission bandwith for pilot channel in uplink single carrier FDMA radio access" Vehicular Technology Conference, 2006. VTC 2006-Spring. IEEE 63RD, May 7, 2006, pp. 334-338, XP002465081.

International Search Report—PCT/US07/080560, International Search Authority—European Patent Office—Jan. 30, 2008.

Written Opinion—PCT/US07/080560, International Search Authority—European Patent Office—Jan. 30, 2008.

* cited by examiner

UPLINK PILOT MULTIPLEXING IN SINGLE USER MIMO AND SDMA FOR SINGLE CARRIER FREQUENCY DIVISION MULTIPLE ACCESS SYSTEMS

CROSS-REFERENCE TO RELATED APPLICATIONS

This application claims the benefit of priority under 35 U.S.C Section 119 from U.S. Provisional Patent Application Ser. No. 60/850,942 entitled "A METHOD AND APPARATUS FOR UPLINK PILOT MULTIPLEXING IN SINGLE USER MIMO AND SDMA", filed on Oct. 10, 2006, the entirety of which is incorporated herein by reference.

BACKGROUND

I. Field

The following description relates generally to wireless communications, and more particularly to uplink pilot multiplexing.

II. Background

Wireless communication systems are widely deployed to provide various types of communication; for instance, voice and/or data may be provided via such wireless communication systems. A typical wireless communication system, or network, can provide multiple users access to one or more shared resources. For instance, these systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can support simultaneous communication for multiple wireless terminals. Each terminal communicates with one or more base stations via transmissions on the forward and reverse links. The forward link (or downlink (DL)) refers to the communication link from the base stations to the terminals, and the reverse link (or uplink (UL)) refers to the communication link from the terminals to the base stations. Such communication links can be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \geq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point. In addition, a MIMO system may support one or more users having a plurality of transmit and/or receive antennas (e.g., single-user MIMO (SU-MIMO)) or multiple users spatially separated to support space-division multiple access (SDMA) or multiple-user MIMO (MU-MIMO).

One problem in connection with SDMA or SU-MIMO is that when multiple wireless terminals or multiple streams from a single wireless terminal are multiplexed on the same bandwidth allocation in SDMA or SU-MIMO respectively, the structure of the respective reference signals, e.g., pilot channel (PICH), should be orthogonal to each other to improve channel estimation and suppress other wireless terminals' interference using a minimum mean square error (MMSE) receiver. It is also desired that low peak-to-average ratio (PAR) is preserved by maintaining a single carrier waveform on the pilot channel to achieve improved wireless transmit power efficiency. This is especially important for improved mobile device battery performance.

For example, in single-carrier communication systems, pilot symbols are transmitted in addition to data symbols in order to provide a reference for the receiver to estimate the channel condition and accordingly demodulate the received signal. Single carrier frequency division multiple access (SC-FDMA) techniques provide an advantage over conventional OFDMA techniques in that the SC-FDMA signal has lower peak-to-average power ratio (PAPR) because of its inherent single carrier structure. As a result, SC-FDMA is especially attractive for use in uplink communications where lower PAPR greatly benefits the wireless terminal in terms of transmit power efficiency.

However, conventional uplink pilot allocation schemes result in fixed or symmetric pilot structures that inflexibly allocates pilot channel bandwidth. As a result, adaptive pilot structures are desired that maintain single carrier structure while preserving the benefits of pilot orthogonality.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating adaptive uplink pilot multiplexing. In various embodiments, uplink pilots can be adaptively multiplexed as a predetermined function of uplink pilot channel information (e.g., number of active streams to be multiplexed).

According to related aspects, a method that facilitates pilot multiplexing is described herein. The method can include determining uplink pilot channel information in a base station. Further, the method can include transmitting the uplink pilot channel information to one or more wireless terminals to facilitate multiplexing uplink pilots by varying pilot channel bandwidth and frequency location per block over time, according to a predetermined function of the uplink pilot channel information. The method can further include receiving and demultiplexing the multiplexed uplink pilots according to the predetermined function.

In a related embodiment of the invention, a method for pilot multiplexing can include receiving uplink pilot channel information from a base station. For example, uplink pilot channel information can include a number of one or more active streams to be multiplexed, a number of available resource blocks, and/or a pilot starting frequency position, any combination thereof, and the like. Additionally, the method can comprise multiplexing uplink pilots by varying pilot channel bandwidth and frequency location per block over time in a wireless terminal according to a predetermined function of the uplink pilot channel information and transmitting the multiplexed pilots.

Another embodiment of the invention relates to a communications apparatus. The communications apparatus can include a memory that retains instructions determining and transmitting uplink pilot channel information, receiving adaptively multiplexed pilots, and demultiplexing the received pilots according to a predetermined function of the uplink pilot channel information. Further, the communications apparatus can include a processor, coupled to the memory, configured to execute the instructions retained in the memory.

Yet another embodiment of the invention relates to a communications apparatus. The communications apparatus can include a memory that retains instructions receiving and processing uplink pilot channel information, adaptively multiplexing pilots by cyclically varying the pilot bandwidth and frequency location per block based on the uplink pilot channel information, and transmitting the adaptively multiplexed pilots. Further, the communications apparatus can include a processor, coupled to the memory, configured to execute the instructions retained in the memory.

In a further embodiment of the invention, a communications apparatus enables adaptive uplink pilot multiplexing. The communications apparatus can include means for receiving and processing uplink pilot channel information. Moreover, the communications apparatus can include means for adaptively multiplexing uplink pilots by cyclically varying the pilot bandwidth and frequency location per block depending on the uplink pilot channel information and transmitting the multiplexed pilots.

A related embodiment of the invention enables a communications apparatus to adaptively multiplex uplink pilots. The communications apparatus can include means for determining and transmitting uplink pilot channel information in a base station. Moreover, the communications apparatus can include means for receiving and demultiplexing adaptively multiplexed pilots. Further, the communications apparatus can include means for frequency division multiplexing respective pilots per active stream in an orthogonal manner per block.

Still another embodiment relates to a machine-readable medium having stored thereon machine-executable instructions for determining and transmitting uplink pilot channel information, receiving adaptively multiplexed pilots, and demultiplexing the received pilots according to a predetermined function of the uplink pilot channel information. In a related embodiment, a machine-readable medium stores machine-executable instructions for receiving and processing uplink pilot channel information, adaptively multiplexing pilots by regularly varying the pilot bandwidth and frequency location per block based on the uplink pilot channel information, and transmitting the adaptively multiplexed pilots.

In accordance with another embodiment of the invention, an apparatus in a wireless communication system can include a processor, wherein the processor can be configured to receive uplink pilot channel data from an access point. The processor can also be configured to multiplex uplink pilots by varying pilot channel bandwidth and frequency location per block over time in a wireless terminal based on at least the uplink pilot channel data. The processor can be further configured to transmit the uplink pilots.

In accordance with a related embodiment of the invention, an apparatus in a wireless communication system may include a processor, wherein the processor may be configured to determine uplink pilot channel data in an access point. The processor can also be configured to transmit the uplink pilot channel information to one or more wireless terminals to facilitate multiplexing uplink pilots by varying pilot channel bandwidth and frequency location per block over time based on at least the uplink pilot channel data. According to further aspects of the invention, the processor can be configured to receive and demultiplex the multiplexed uplink pilots according to the function.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
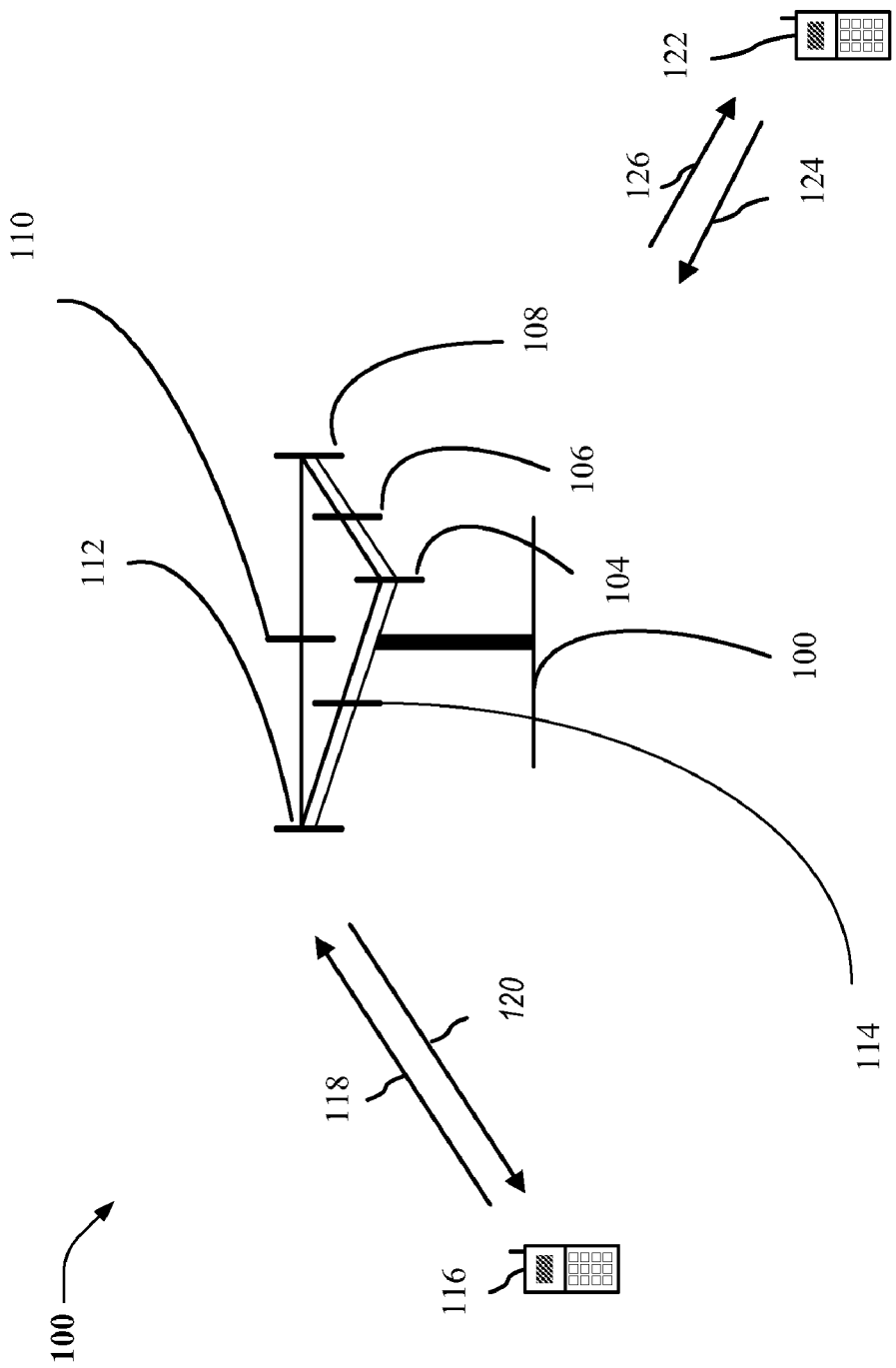
FIG. 1 illustrates a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

In addition, various aspects of the present invention are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of multiplexing uplink pilot signals in a SC-FDMA communications system. One skilled in the art should appreciate that similar techniques could apply to other communication environments.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a wireless terminal or user equipment (UE). A wireless terminal or UE can also be called a system, subscriber unit, subscriber station, mobile station, mobile, mobile device, remote station, remote terminal, access terminal, user terminal, terminal, wireless communication device, user agent, or user device. A wireless terminal or UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with wireless terminal(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. Additionally it should be appreciated that a carrier wave can be employed to carry computer-readable electronic data or instructions such as those used in transmitting and receiving voice mail, in accessing a network such as a cellular network, or in instructing a device to perform a specified function. Accordingly, the term "machine-readable medium" can include, without being limited to, wireless channels and various other media capable of storing, containing, and/or carrying instruction(s) and/or data. Of course, those skilled in the art will recognize many modifications may be made to the disclosed embodiments without departing from the scope or spirit of the invention as described and claimed herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the above techniques may be described below in the context of uplink pilot multiplexing as it applies to LTE, and as a result, 3GPP terminology may be used be used in much of the description below, where appropriate.

As described above, SC-FDMA, which utilizes single carrier modulation and frequency domain equalization is a technique attractive for uplink multiple access for its inherent transmit power efficiency. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. As a result, SC-FDMA is currently a working assumption for uplink multiple access scheme in 3GPP Long Term Evolution (LTE), or Evolved UTRA.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

Referring now to FIG. 1, a multiple access wireless communication system according to one embodiment is illustrated. Access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

As described above, an access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
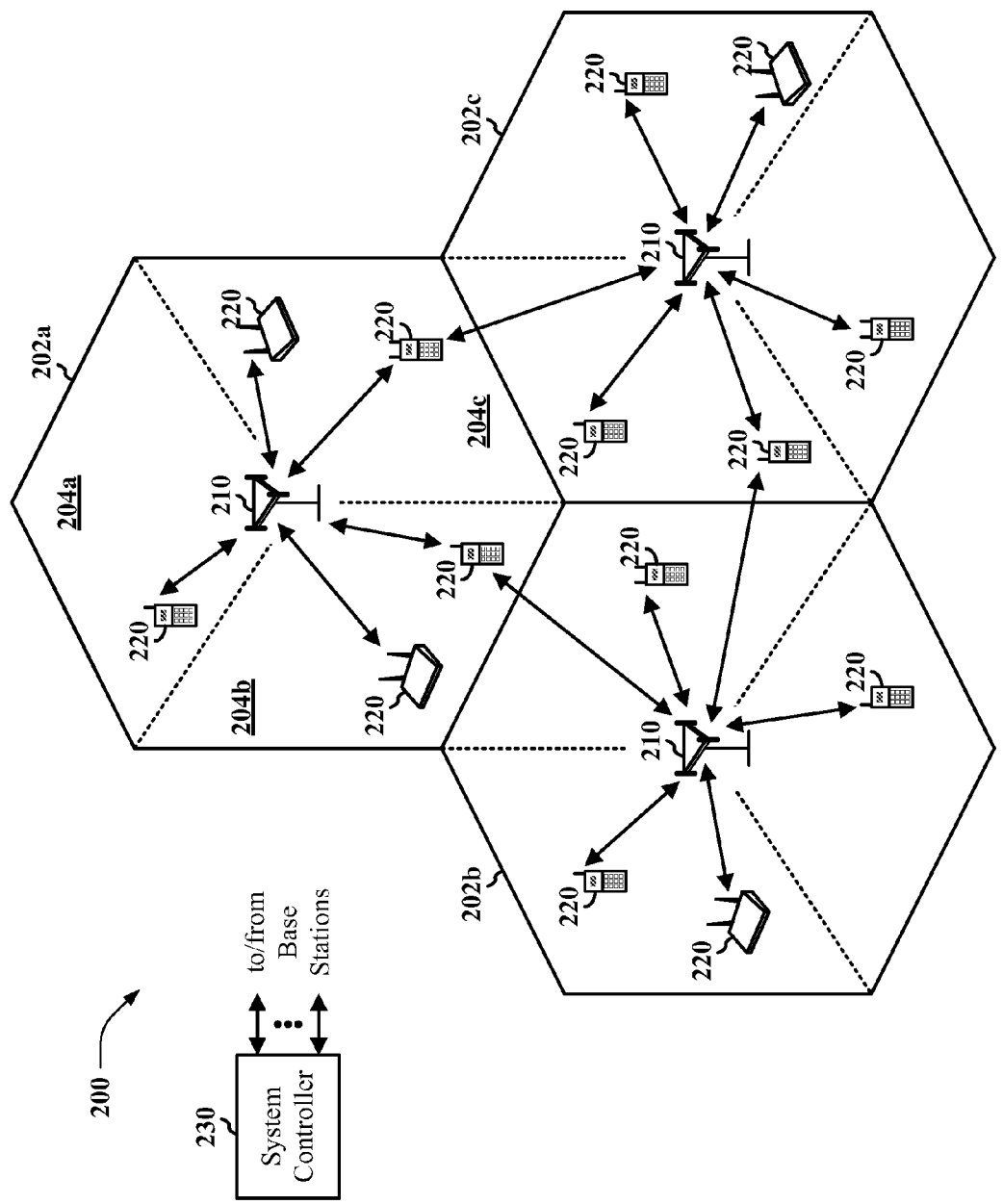
FIG. 2 illustrates a wireless communication system in accordance with further aspects of the present invention.

FIG. 2 illustrates a wireless communication system 200 with multiple base stations 210 and multiple terminals 220 as may be utilized in conjunction with one or more aspects of the present invention. A base station is generally a fixed station that communicates with the terminals and may also be called an access point, a Node B, or some other terminology. Each base station 210 provides communication coverage for a particular geographic area, illustrated as three geographic areas, labeled 202a, 202b, and 202c. The term "cell" can refer to a base station and/or its coverage area depending on the context in which the term is used. To improve system capacity, a base station coverage area may be partitioned into multiple smaller areas (e.g., three smaller areas, according to cell 202a in FIG. 2), 204a, 204b, and 204c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 220 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 220 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 230 couples to base stations 210 and provides coordination and control for base stations 210. For a distributed architecture, base stations 210 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points via one or more antennas at the terminals 220 and or at the base stations 210, as described above with respect to FIG. 1.

Figure 3A:
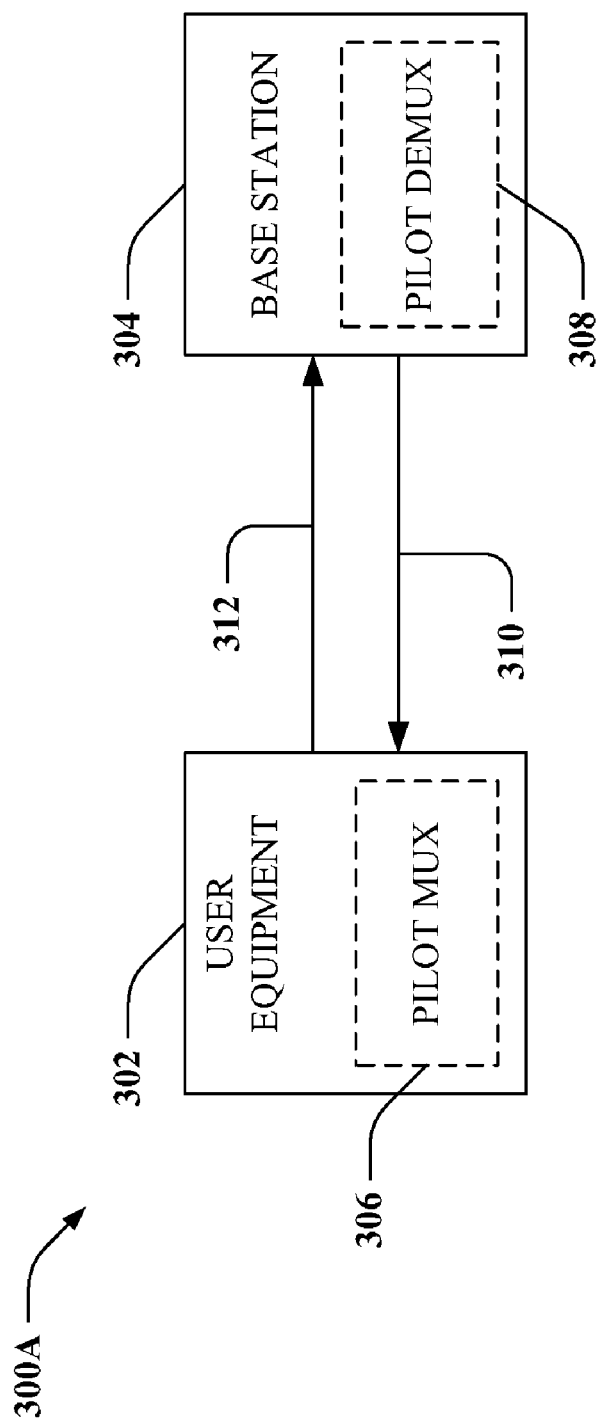
FIG. 3A illustrates an exemplary non-limiting high-level block diagram of a system that facilitates pilot channel multiplexing according to various aspects of the present invention.

FIG. 3A illustrates an exemplary non-limiting high-level block diagram of a system that facilitates pilot channel multiplexing according to various aspects of the present invention. The system 300A includes user equipment 302 that is communicatively coupled to a base station 304 in a wireless manner. In other words, base station 304 is providing voice and/or data services to UE 302 over a downlink 310 and receiving communications from user equipment 302 over an uplink 312, such as a SC-FDMA uplink. User equipment 302 can be mobile in nature, such that quality associated with signals received from base station 304 can vary as UE 302 translates to a different geographic region. User equipment 302 can include a pilot multiplexer 306 that can adaptively multiplex uplink pilot signals in accordance with the schemes discussed herein to enable channel condition estimation among other functions. In another aspect, base station 304 can demultiplex pilot signals using pilot demultiplexer 308 such that the adaptively multiplexed pilot signals can be used to improve channel estimation and suppress interference from other UE. In addition, it should be appreciated that UE 302 and/or base station 304 can include other ancillary components which facilitates, among other functions, communication of associated information or data used to adaptively determine the pilot allocation scheme. For example, according to various embodiments of the invention, the base station can transmit the number of active wireless terminals 302 for SDMA or streams for SU-MIMO and the pilot allocation identifier such that the subject UE 302, the base station 304, and the other active wireless terminals can adaptively determine the pilot multiplexing scheme. In addition, while uplink 312 and downlink channels 310 are shown as a single arrow, it is to be appreciated that the invention contemplates the use of a plurality of transmit and receive antennas, such as would be the case for a single-user MIMO (SU-MIMO) system.

Furthermore, it should be understood that, the term "multiplex" in the context of user equipment 302 uplink channel as described herein refers to the process of selecting bandwidth resources in such a manner as to preserve orthogonality of pilots while facilitating simultaneous transmission from multiple transmission sources (e.g., antennas) over a shared medium (e.g., a wireless channel), depending on the context, in addition to conventional definitions of the word referring to physical combination of signals. For example, in SU-MIMO, multiple transmit antennas in a UE 302 or portion thereof can be used to transmit on the uplink channel simultaneously (multiplexed) according to the scheme as described herein, while the multiplexed signals may not be physically combined in the UE 302 or portion thereof. In a further example, SDMA or MU-MIMO, multiple individual UE 302 may simultaneously transmit on a channel over a single antenna, where no actual signal combination occurs in the UE 302 or portion thereof. Rather, the process of multiplexing in this instance refers to the selection of specific portions of shared resources by UE 302 such that the individual signals can be simultaneously transmitted over a shared physical channel and subsequently demultiplexed.

Figure 3B:
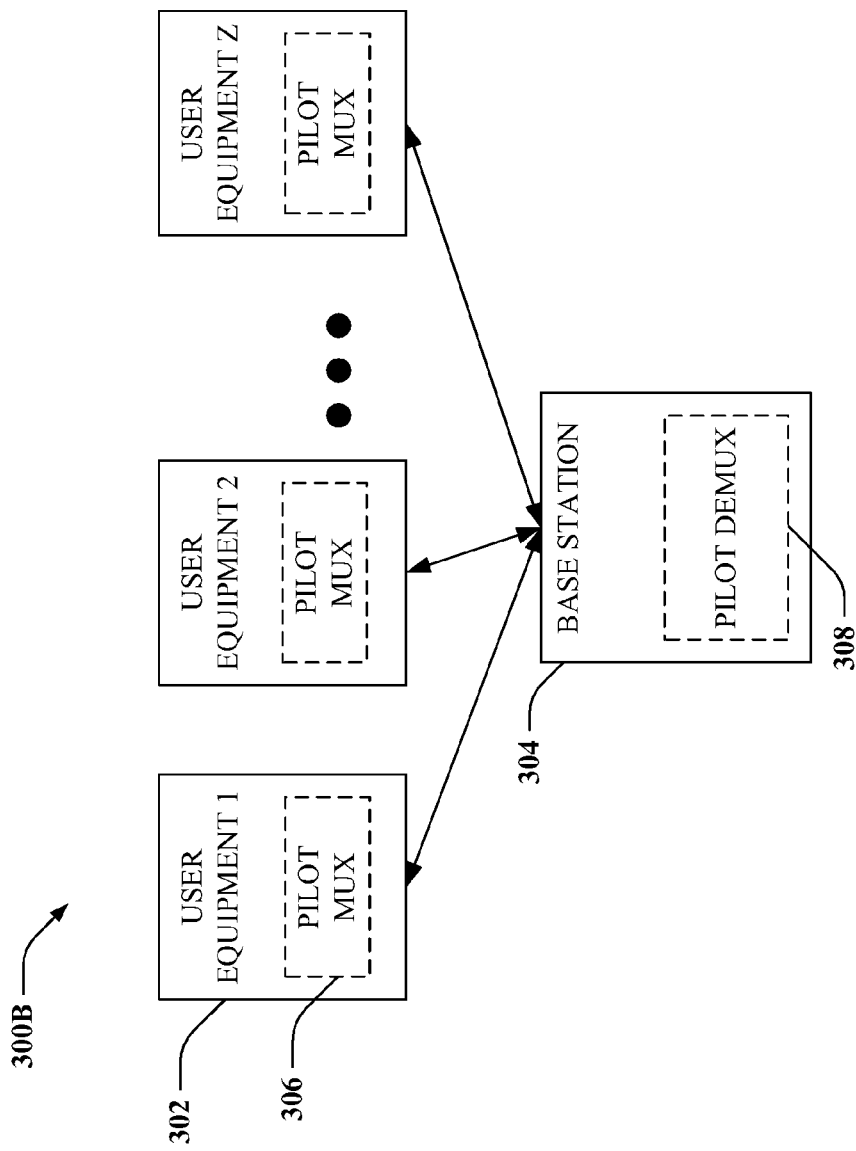
FIG. 3B illustrates a base station receiving signals from a plurality of user equipment such that uplink pilot signals can be adaptively multiplexed according to various aspects of the present invention.

FIG. 3B illustrates a base station 304 receiving signals from a plurality of UE 302 such that uplink pilot signals are adaptively multiplexed according to various aspects of the present invention. Base station 304 is shown receiving signals from a plurality of UE 302 (1-Z), Z being an integer, such as would be the case for an multi-user MIMO (MU-MIMO) space-division multiple access (SDMA) system.

The following discussion provides additional background information regarding signaling between the network (e.g., base station 304 and or system controller 230) and the wireless terminal (e.g., UE 302 or access terminal 220) in the context of UMTS. In an aspect, logical channels are classified into Control Channels and Traffic Channels. Logical Control Channels comprise Broadcast Control Channel (BCCH), which is a DL channel for broadcasting system control information. Paging Control Channel (PCCH), which is DL channel that transfers paging information. Multicast Control Channel (MCCH), which is point-to-multipoint DL channel used for transmitting Multimedia Broadcast and Multicast Service (MBMS) scheduling and control information for one or several Multicast Traffic Channels (MTCHs). Generally, after establishing Radio Resource Control (RRC) connection, this channel is only used by UEs 302 that receive MBMS. Dedicated Control Channel (DCCH) is point-to-point bi-directional channel that transmits dedicated control information and used by UEs 302 having an RRC connection. In a further aspect, logical traffic channels comprise a Dedicated Traffic Channel (DTCH), which is point-to-point bi-directional channel, dedicated to one UE for the transfer of user information. Also, a MTCH for Point-to-multipoint DL channel for transmitting traffic data.

In a further aspect, transport channels are classified into DL and UL. DL transport channels comprise a Broadcast Channel (BCH), Downlink Shared Data Channel (DL-SDCH), and a Paging Channel (PCH), the PCH for support of UE power saving (Discontinuous Reception (DRX) cycle is indicated by the network to the UE), broadcasted over entire cell and mapped to PHY resources, which can be used for other control/traffic channels. The UL transport channels comprise a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

According to exemplary nonlimiting embodiments of the invention, a channel structure is provided that preserves low PAR (e.g., at any given time, the channel is contiguous or uniformly spaced in frequency) properties of a single carrier waveform. According to further nonlimiting embodiments, when multiple UEs or streams from a single ULE are multiplexed on the same bandwidth allocation in SDMA or single user MIMO respectively, the invention advantageously maintains pilot orthogonality for improved channel estimation and suppression of channel interference. In addition, as described above, the invention advantageously maintains a single carrier waveform on the pilot channel for improved wireless transmit power efficiency for wireless terminals on the uplink channel. Thus, described herein is a method for multiplexing UE on the same bandwidth in SDMA (e.g., MU-MIMO) or SU-MIMO while maintaining a single carrier waveform on the pilot in all scenarios.

For the purposes of description of a particular non-limiting embodiment of the invention, the following nomenclature is used. One having ordinary skill in the art would recognize that various modification could be made without departing from the spirit of the disclosed invention. Thus, it should be understood that the description herein is but one of many embodiments that may be possible while keeping within the scope of the claims appended hereto. SDCH is a Shared Data Channel, PICH is a Pilot Channel, RB is a Resource Block, LB and SB refers to Long Block and Short Block respectively, a Slot is 0.5 millisecond (ms) collection of RBs comprising 6 LBs and 2 SBs, and TTI is a Transmission Time Interval comprising 2 slots.

Figure 4:
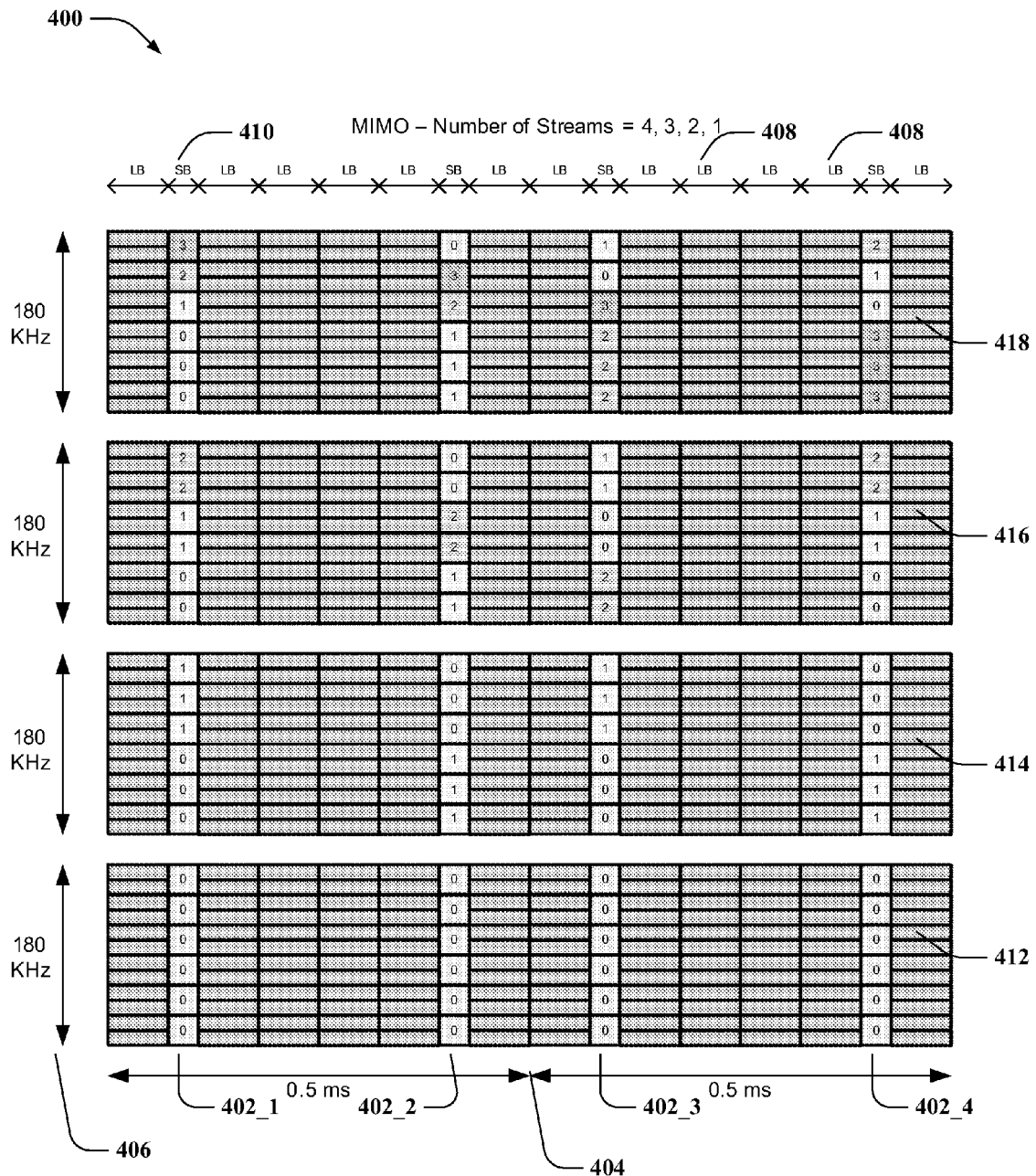
FIG. 4 depicts an exemplary non-limiting adaptive pilot multiplexing scheme according to various aspects of the present invention.

FIG. 4 depicts an exemplary non-limiting adaptive pilot allocation scheme 400 according to various aspects of the present invention for up to four streams (e.g., stream 0, 1, 2, and 3). It is to be appreciated that a stream could refer to one of a multiple of uplink transmissions from a single wireless UE 302 (e.g., SU-MIMO), to one of a multiple of uplink transmissions from a multiple wireless UE 302 (e.g., SDMA), or to any combination thereof, and the like. In addition, while for purposes of illustration, SDCH and PICH are shown as occupying respective LB 408 and SB 410, such a choice is not essential to the function of the invention. As a result, while a particular embodiment may be described in the context of the pilot channel occupying the SB resource block, it should understood that any set of blocks suitable for mapping the pilot bandwidth can be used, and SB is depicted in the discussion as a matter of convenience in relating the concepts described herein. With regard to data multiplexing structure, typically in SU-MIMO or SDMA scenarios, multiple data streams are multiplexed on the same RB 406. While the choice of data stream SDCH multiplexing is typically performed by the scheduler such that these streams are spatially separable with MMSE suppression at the receiver, the invention advantageously provides an orthogonal pilot structure 402 for each stream that ensures a high pilot $SN_R$ and an accurate MMSE pre-processing of data. In addition, to maintain a single carrier waveform, the pilot and data is transmitted in a localized manner. In the exemplary non-limiting embodiment of FIG. 4, such a multiplexing structure can comprise a 1 ms TTI 404 split into 12 LB 408 and 4 SB 410, where SDCH can be transmitted on 12 LB 408, and PICH can be transmitted on 4 SB 410. In the particular embodiment, the FDM PICH structure for 1 RB spans 180 KHz and is the minimum unit of transmission in the uplink. The PICH granularity is 30 KHz, in other words, the PICH bandwidth can increase in increments of 30 KHz or provide 6 tones for each minimum unit of transmission in the uplink. FIG. 4 depicts the results of an adaptive pilot multiplexing scheme where the PICH structure is adaptive such that the PICH bandwidth per symbol is a function of number of streams being multiplexed according to various non-limiting embodiments of the invention. For example, FIG. 4 can represent 4 streams from a single user or 1 stream each from 4 users as described above. The grey-cell area denotes the LB 408 where SDCH from all streams is sent. The PICH is sent in SB 402 and the PICH frequency division FDM orthogonality can be shown by the indicators "0" for stream 1, "1" for stream 2, "2" for stream 3, and "3" for stream 4.

Several results of the provided adaptive pilot multiplexing scheme can be observed from FIG. 4. For example, according to various non-limiting embodiments, the PICH bandwidth and frequency location per SB 402 can vary in time as a function of the number of active streams (e.g., current transmission on the uplink channel, whether from SU-MIMO, SDMA, or any combination thereof). According to further non-limiting embodiments, the PICH for each stream has the same constant time/bandwidth allocation spanning the entire 1 ms TTI 404. Additionally, the invention advantageously provides a PICH waveform that preserves the low PAR single carrier waveform for improved wireless transmit power efficiency by cyclically shifting PICH frequency location for each stream across SB in time while maintain PICH per stream contiguous in frequency, according to various aspects of the invention. Furthermore, the provided adaptive pilot multiplexing schemes maintain orthogonality per SB 402 as the PICH per stream can be frequency division multiplexed in an orthogonal manner to improve channel estimation and suppress other wireless terminals' interference.

For the example in FIG. 4, of the straightforward case 414 of two streams (0 and 1) in SB 402_1, the first 0.5 ms slot shows the stream 1 first at the upper end of the RB 406 occupying the upper three tones. In the second SB 402_2, the stream hops to the lower portion of RB 406 occupying the lower three tones. The pattern then repeats, resulting in a PICH per stream contiguous in frequency with constant time/bandwidth allocation spanning the entire 1 ms TTI 404. However, as more streams are added, the multiplexing scheme adapts while maintaining the aforementioned advantages (e.g., single carrier, orthogonality, constant time/bandwidth allocation spanning a TTI). For example, in case 418 with four streams, the pattern is non-repeating within the TTI 404, but maintains the PICH per stream contiguous in frequency with constant time/bandwidth allocation spanning the entire 1 ms TTI 404.

As described above, various modifications can be made to the adaptive pilot multiplexing scheme as described with reference to FIG. 4 without departing from the scope of the claims appended hereto. For example, according to further non-limiting embodiments, the PICH structure in FIG. 4 can be extended for N RB and M streams as follows.

For N=Odd:
if M=1, or 2 or 3
PICH bandwidth is the same as data in all SB
PICH bandwidth=((180/M)*N) KHz
if M=4
PICH bandwidth is the not the same in all SB
PICH bandwidth of stream m in SB index m=(90*N) KHz PICH bandwidth of stream m in other SB=(30*N) KHz For N=even:

if M=1 or 2 or 3 or 4

PICH bandwidth is the same as data in all SB

PICH bandwidth=((180/M)*N) KHz

As should be observed, such an extension provides similar advantages as that described above with respect to FIG. 4.

Figure 5:
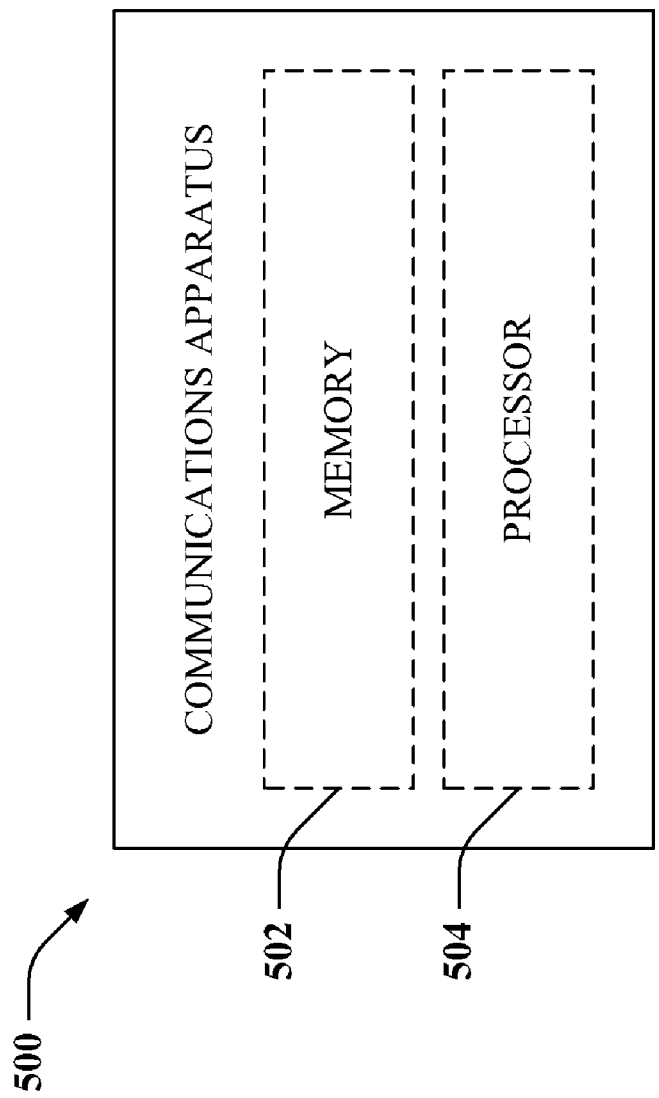
FIG. 5 illustrates a communications apparatus for employment within a wireless communications environment according to various aspects of the invention.

Now referring to FIG. 5, a communications apparatus 500 for employment within a wireless communications environment is illustrated. The apparatus 500 can be a base station 304 or a portion thereof or user equipment 302 or a portion thereof (such as a secure digital (SD) card coupled to a processor). Apparatus 500 can include a memory 502 that retains various instructions with respect to signal processing, scheduling communications, requesting measurement gaps, and/or the like. For instance, if apparatus 500 is user equipment as described below in connection with FIGS. 11-12 and 15, memory 502 can include instructions for analyzing quality of signals on an uplink and/or downlink channel with respect to a particular base station. Further, memory 502 can comprise instructions for adaptively multiplexing PICH by varying the PICH bandwidth and frequency location per SB 402 in time as a function of the number of active streams. To that end, memory 502 can comprise instructions for receiving and processing uplink pilot channel data (e.g., number of active streams and/or indicated starting frequency location, number of available RBs 406, any combination thereof, and/or the like) from a base station 304 in order to facilitate adaptively multiplexing uplink pilots according to a predetermined scheme, in accordance with various aspects of the invention. In addition, memory 502 can comprise instructions for facilitating transmission of the adaptively multiplexed PICH. The above example instructions and other suitable instructions can be retained within memory 502, and a processor 504 can be utilized in connection with executing the instructions (depending upon, for instance, number of active streams, frequency starting position, etc.).

Figure 9:
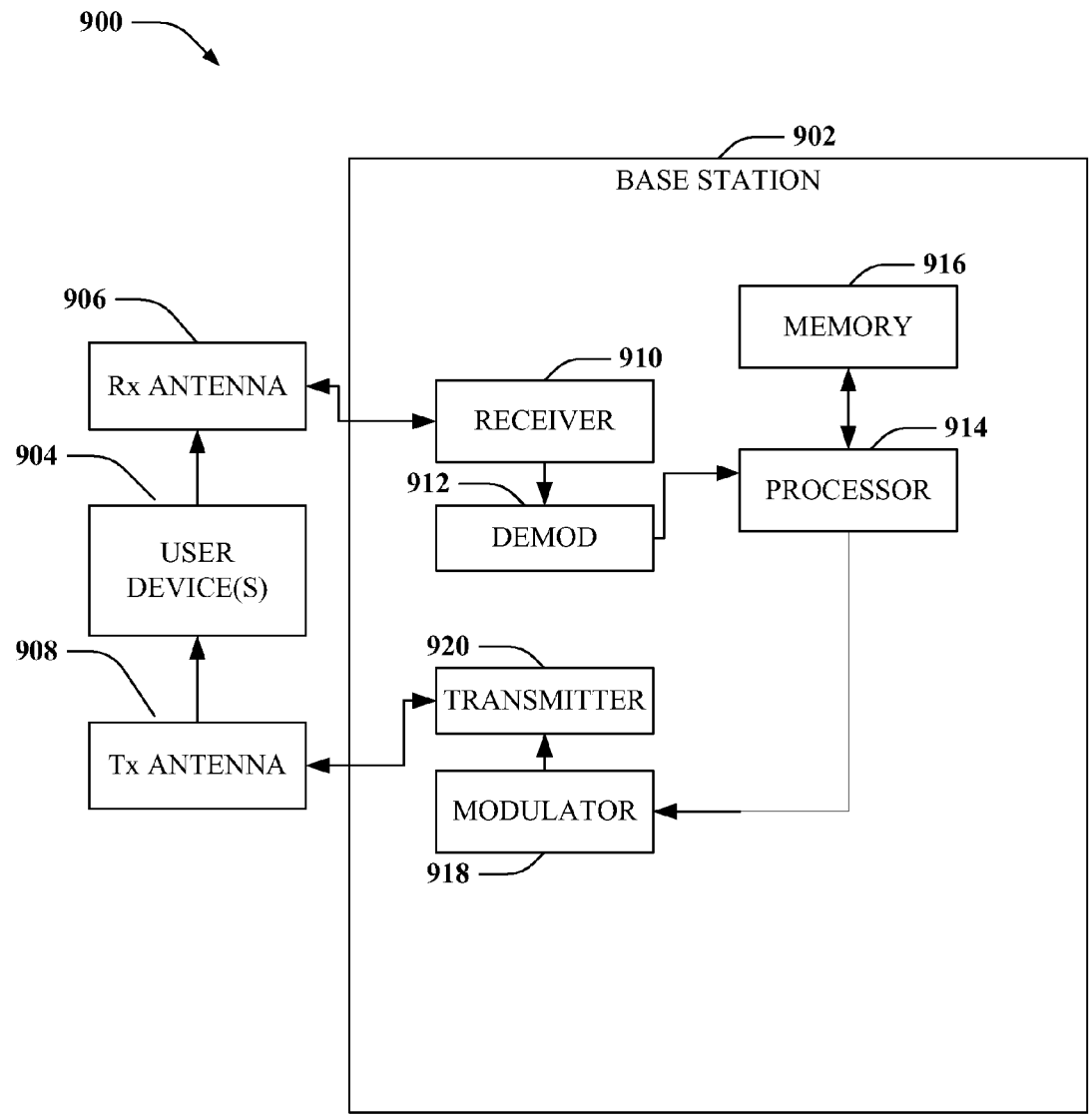
FIG. 9 illustrates a system that can be utilized in connection with uplink pilot multiplexing with respect to user equipment in accordance with various embodiments.

Also, as stated above, apparatus 500 can be a base station and/or a portion thereof as described below in connection with FIGS. 9-10 and 14. As an example, memory 502 can include instructions for receiving an indication that user equipment serviced by apparatus 500 is taking measurements with respect to other technologies and/or frequencies. Memory 502 can additionally include instructions for determining and transmitting uplink pilot channel data (e.g., number of active streams and/or indicated starting frequency location, number of available RBs 406, any combination thereof, and/or the like) to UE 302 in order to facilitate demultiplexing the adaptively multiplexed PICH according to a predetermined scheme, in accordance with various aspects of the invention. To that end, memory 502 can further include instructions for facilitating reception of the adaptively multiplexed PICH. Processor 504 can be employed to execute instructions retained within memory 502. While several examples have been provided, it is understood that instructions described in the form of methodologies (e.g., FIGS. 6-7) can be included within memory 502 and executed by processor 504.

Figure 6:
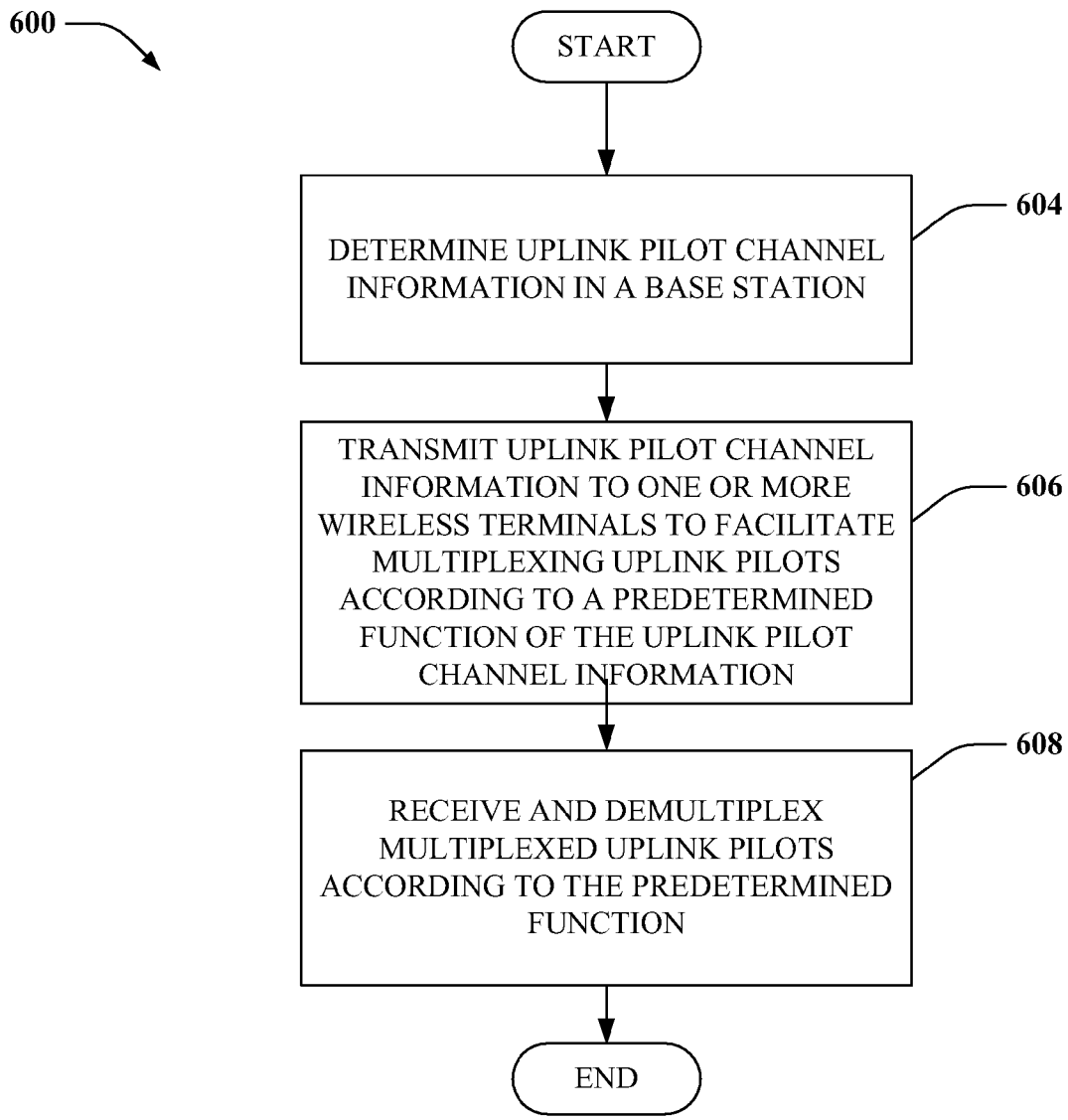
FIG. 6 illustrates one particular high-level methodology for adaptive uplink pilot multiplexing in accordance with various embodiments described herein.
Figure 7:
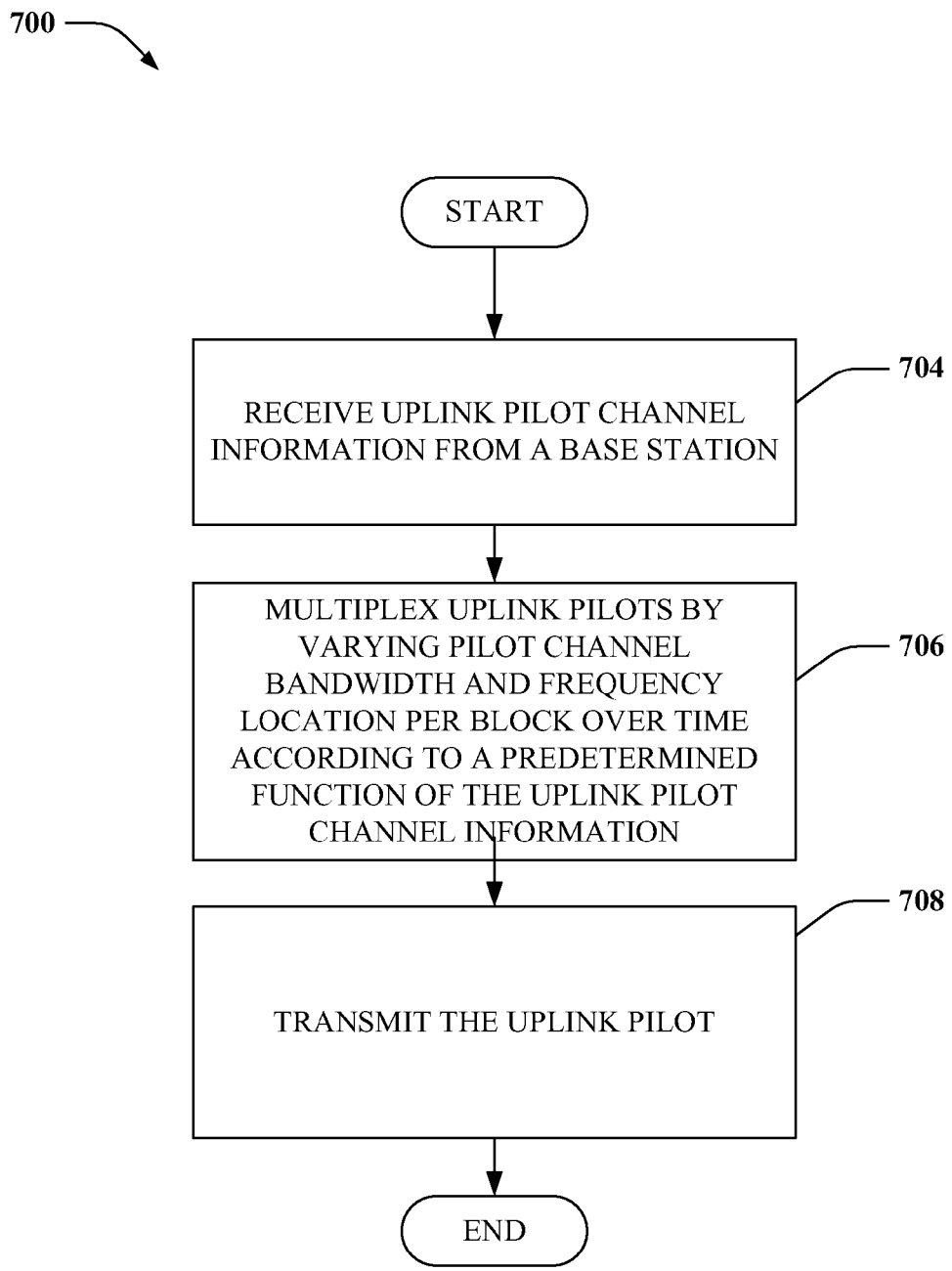
FIG. 7 illustrates a further particular high-level methodology for adaptive uplink pilot multiplexing in accordance with various embodiments described herein.

Referring to FIGS. 6 and 7, particular high-level methodologies for adaptive uplink pilot multiplexing in accordance with various embodiments are illustrated. While, for purposes of simplicity of explanation, the methodologies are shown and described as a series of acts, it is to be understood and appreciated that the methodologies are not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

FIG. 6 illustrates one particular high-level methodology 600 facilitating uplink pilot multiplexing in connection with adaptive pilot multiplexing schemes described herein. At 604, uplink pilot channel information (e.g., number of active streams and/or indicated starting frequency location, number of available RBs 406, any combination thereof, and/or the like) necessary to facilitate adaptive pilot multiplexing scheme according to a predetermined function of the number of active streams is determined in the base station 304 or a portion thereof. At 606, the respective uplink pilot channel information is transmitted to one or more UE 302 to facilitate UE 302 adaptive pilot multiplexing by varying the pilot channel bandwidth and frequency location per SB 402 in time according to the predetermined function of the number of active streams. At 608, in response to receiving multiplexed pilots from UE 302, base station 304, or a portion thereof, demultiplexes the multiplexed pilot channel according to the predetermined function and the respective uplink pilot channel information.

FIG. 7 illustrates one particular high-level methodology 700 for facilitating uplink pilot multiplexing in connection with adaptive pilot multiplexing schemes described herein. In response to receiving respective uplink pilot channel information at 704 from a base station 304 or a portion thereof, UE 302 or a portion thereof adaptively multiplexes pilots at 706 by varying the pilot channel bandwidth and frequency location per SB 402 in time according to a predetermined function of the number of active streams. At 706, the UE 302 or a portion thereof transmits the adaptively multiplexed pilots.

Figure 8:
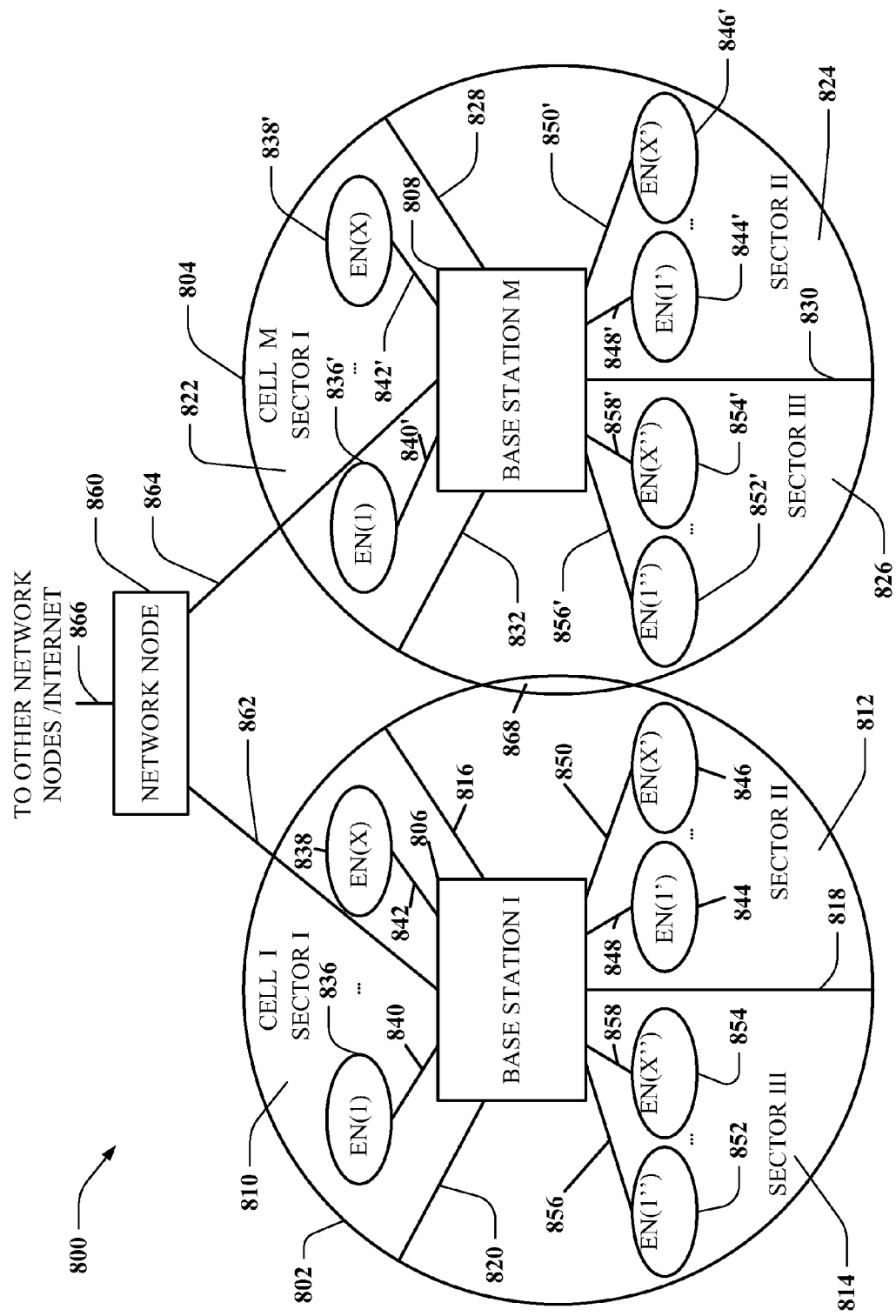
FIG. 8 illustrates an example communication system implemented in accordance with various aspects including multiple cells.

FIG. 8 depicts an example communication system 800 implemented in accordance with various aspects including multiple cells: cell I 802, cell M 804. Note that neighboring cells 802 and 804 overlap slightly, as indicated by cell boundary region 868, thereby creating potential for signal interference between signals transmitted by base stations in neighboring cells. Each cell 802 and 804 of system 800 includes three sectors. Cells which have not be subdivided into multiple sectors (N=1), cells with two sectors (N=2) and cells with more than 3 sectors (N>3) are also possible in accordance with various aspects. Cell 802 includes a first sector, sector I 810, a second sector, sector II 812, and a third sector, sector III 814. Each sector 810, 812, 814 has two sector boundary regions; each boundary region is shared between two adjacent sectors.

Sector boundary regions provide potential for signal interference between signals transmitted by base stations in neighboring sectors. Line 816 represents a sector boundary region between sector I 810 and sector II 812; line 818 represents a sector boundary region between sector II 812 and sector III 814; line 820 represents a sector boundary region between sector III 814 and sector I 810. Similarly, cell M 804 includes a first sector, sector I 822, a second sector, sector II 824, and a third sector, sector III 826. Line 828 represents a sector boundary region between sector I 822 and sector II 824; line 830 represents a sector boundary region between sector II 824 and sector III 826; line 832 represents a boundary region between sector III 826 and sector I 822. Cell I 802 includes a base station (BS), base station I 806, and a plurality of end nodes ($EN_S$) (e.g., wireless terminals) in each sector 810, 812, 814. Sector I 810 includes EN(1) 836 and EN(X) 838 coupled to BS 806 via wireless links 840, 842, respectively; sector II 812 includes EN(1') 844 and EN(X') 846 coupled to BS 806 via wireless links 848, 850, respectively; sector III 814 includes EN(1") 852 and EN(X") 854 coupled to BS 806 via wireless links 856, 858, respectively. Similarly, cell M 804 includes base station M 808, and a plurality of end nodes ($EN_S$) in each sector 822, 824, 826. Sector I 822 includes EN(1) 836' and EN(X) 838' coupled to BS M 808 via wireless links 840', 842', respectively; sector II 824 includes EN(1') 844' and EN(X') 846' coupled to BS M 808 via wireless links 848', 850', respectively; sector 3 826 includes EN(1") 852' and EN(X") 854' coupled to BS 808 via wireless links 856', 858', respectively.

System 800 also includes a network node 860 which is coupled to BS I 806 and BS M 808 via network links 862, 864, respectively. Network node 860 is also coupled to other network nodes, e.g., other base stations, AAA server nodes, intermediate nodes, routers, etc. and the Internet via network link 866. Network links 862, 864, 866 can be, e.g., fiber optic cables. Each end node, e.g., EN(1) 836 can be a wireless terminal including a transmitter as well as a receiver. The wireless terminals, e.g., EN(1) 836 can move through system 800 and can communicate via wireless links with the base station in the cell in which the EN is currently located. The wireless terminals, (WTs), e.g., EN(1) 836, can communicate with peer nodes, e.g., other WTs in system 800 or outside system 800 via a base station, e.g., BS 806, and/or network node 860. WTs, e.g., EN(1) 836 can be mobile communications devices such as cell phones, personal data assistants with wireless modems, etc. Respective base stations or portions thereof can perform pilot uplink channel information determination and transmission. Additionally, respective base stations or portions thereof can perform uplink pilot demultiplexing according to the various aspects provided herein. The wireless terminals or portions thereof can use the provided respective uplink pilot channel information to facilitate adaptively multiplexing pilots by varying the pilot channel bandwidth and frequency location per SB 402 in time according to a predetermined function of the number of active streams according to the various aspects provided herein. Additionally, wireless terminals or portions thereof can transmit multiplexed pilots to the respective base stations FIG. 9 illustrates a system that can be utilized in connection with adaptive uplink pilot multiplexing schemes with respect to user equipment. System 900 comprises a base station 902 with a receiver 910 that receives signal(s) from one or more user devices 904 by way of one or more receive antennas 906, and transmits to the one or more user devices 904 through a plurality of transmit antennas 908. In one example, receive antennas 906 and transmit antennas 908 can be implemented using a single set of antennas. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 914 similar to processor 1106 described below with regard to FIG. 11, and is coupled to a memory 916 that stores information related to user device assignments, lookup tables related thereto and the like. Receiver output for each antenna can be jointly processed by receiver 910 and/or processor 914. A modulator 918 can multiplex the signal for transmission by a transmitter 920 through transmit antennas 908 to user devices 904.

Figure 10:
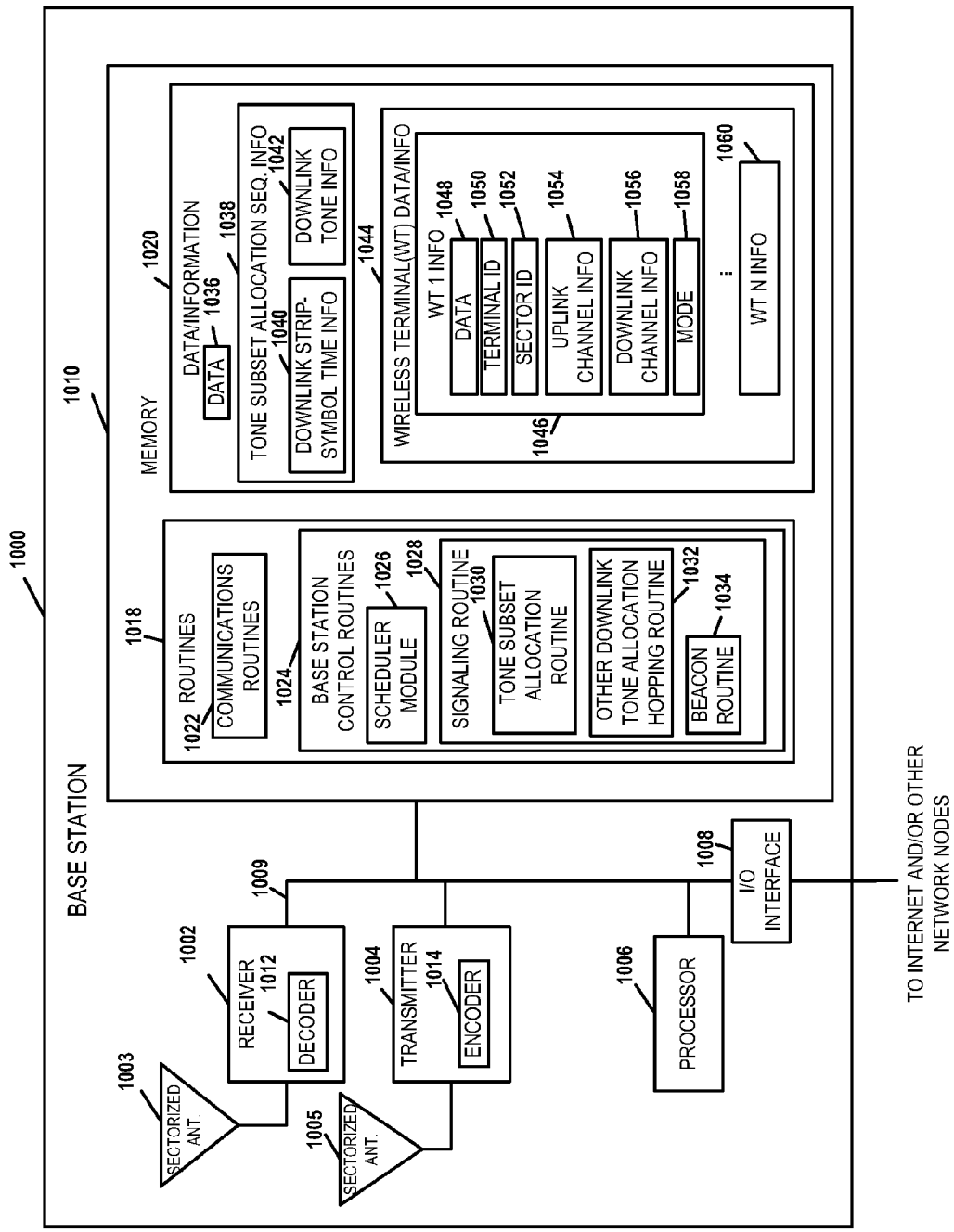
FIG. 10 illustrates an exemplary non-limiting block diagram of a base station in accordance with various aspects of the invention.

FIG. 10 illustrates an example base station 1000 in accordance with various aspects of the present invention. Base station 1000 or portions thereof implements various aspect of the present invention. For example, base station 1000 can determine pilot uplink channel information determination for subsequent transmission to facilitate adaptive pilot multiplexing in associated user equipment. Base station 1000 can be used as any one of base stations 806, 808 of the system 800 of FIG. 8. The base station 1000 includes a receiver 1002, a transmitter 1004, a processor 1006, e.g., CPU, an input/output interface 1008 and memory 1010 coupled together by a bus 1009 over which various elements 1002, 1004, 1006, 1008, and 1010 can interchange data and information.

Sectorized antenna 1003 coupled to receiver 1002 is used for receiving data and other signals, e.g., channel reports, from wireless terminals transmissions from each sector within the base station's cell and can comprise one or more receive antennas. Sectorized antenna 1005 coupled to transmitter 1004 is used for transmitting data and other signals, e.g., control signals, pilot signal, beacon signals, etc. to wireless terminals 1200 (see FIG. 12) within each sector of the base station's cell. In various aspects, base station 1000 can employ multiple receivers 1002 and multiple transmitters 1004, e.g., an individual receiver 1002 for each sector and an individual transmitter 1004 for each sector. As described above, it is to be appreciated that various modifications are possible. For example, in a SU-MIMO system, multiple transmit and receive antennas, receivers, etc. in the base station and user equipment can be used. Similarly, for SDMA systems, multiple users can transmit and receive signals from a base station having multiple transmit and receive antennas, receivers, etc. Processor 1006, can be, e.g., a general purpose central processing unit (CPU). Processor 1006 controls operation of base station 1000 under direction of one or more routines 1018 stored in memory 1010 and implements the methods. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, tone subset allocation sequence information 1038 including downlink strip-symbol time information 1040 and downlink tone information 1042, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes a scheduler module 1026 and signaling routines 1028 including a tone subset allocation routine 1030 for strip-symbol periods, other downlink tone allocation hopping routine 1032 for the rest of symbol periods, e.g., non strip-symbol periods, and a beacon routine 1034.

Data 1036 includes data to be transmitted that will be sent to encoder 1014 of transmitter 1004 for encoding prior to transmission to WTs, and received data from WTs that has been processed through decoder 1012 of receiver 1002 following reception. Downlink strip-symbol time information 1040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1042 includes information including a carrier frequency assigned to the base station 1000, the number and frequency of tones, and the set of tone subsets to be allocated to the strip-symbol periods, and other cell and sector specific values such as slope, slope index and sector type.

Data 1048 can include data that WT1 1200 has received from a peer node, data that WT 1 1200 desires to be transmitted to a peer node, and downlink channel quality report feedback information. Terminal ID 1050 is a base station 1000 assigned ID that identifies WT 1 1200. Sector ID 1052 includes information identifying the sector in which WT1 1200 is operating. Sector ID 1052 can be used, for example, to determine the sector type. Uplink channel information 1054 includes information identifying channel segments that have been allocated by scheduler 1026 for WT1 1200 to use, e.g., uplink traffic channel segments for data, dedicated uplink control channels for requests, power control, timing control, number of active streams etc. Each uplink channel assigned to WT1 1200 includes one or more logical tones, each logical tone following an uplink hopping sequence according to various aspects of the present invention. Downlink channel information 1056 includes information identifying channel segments that have been allocated by scheduler 1026 to carry data and/or information to WT1 1200, e.g., downlink traffic channel segments for user data. Each downlink channel assigned to WT1 1200 includes one or more logical tones, each following a downlink hopping sequence. Mode information 1058 includes information identifying the state of operation of WT1 1200, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1028 controls the operation of receiver 1002 with its decoder 1012 and transmitter 1004 with its encoder 1014. The signaling routine 1028 is responsible for controlling the generation of transmitted data 1036 and control information. Tone subset allocation routine 1030 constructs the tone subset to be used in a strip-symbol period using the method of the aspect and using data/information 1020 including downlink strip-symbol time info 1040 and sector ID 1052. The downlink tone subset allocation sequences will be different for each sector type in a cell and different for adjacent cells. The WTs 1200 receive the signals in the strip-symbol periods in accordance with the downlink tone subset allocation sequences; the base station 1000 uses the same downlink tone subset allocation sequences in order to generate the transmitted signals. Other downlink tone allocation hopping routine 1032 constructs downlink tone hopping sequences, using information including downlink tone information 1042, and downlink channel information 1056, for the symbol periods other than the strip-symbol periods. The downlink data tone hopping sequences are synchronized across the sectors of a cell. Beacon routine 1034 controls the transmission of a beacon signal, e.g., a signal of relatively high power signal concentrated on one or a few tones, which can be used for synchronization purposes, e.g., to synchronize the frame timing structure of the downlink signal and therefore the tone subset allocation sequence with respect to an ultra-slot boundary.

Figure 11:
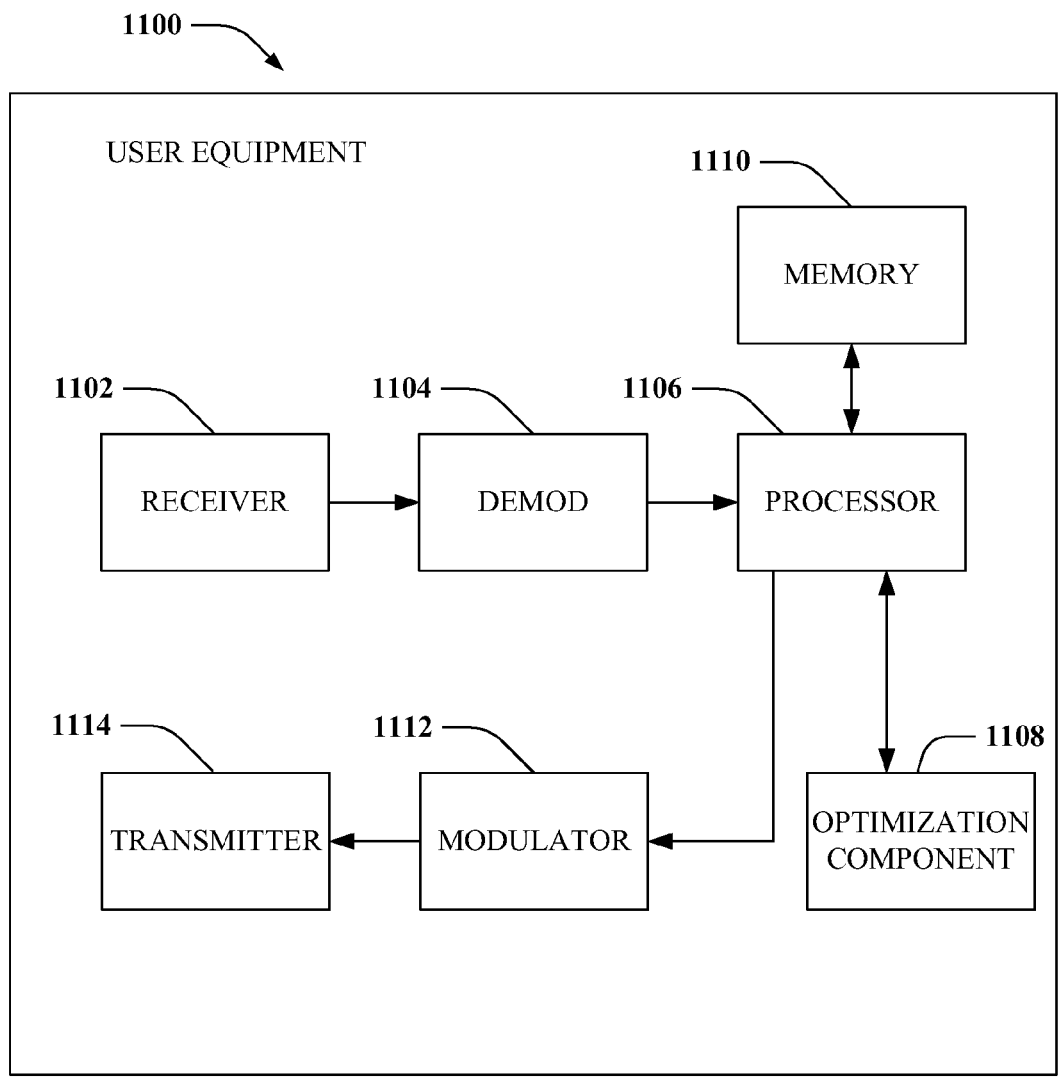
FIG. 11 illustrates a system that can be utilized in connection with uplink pilot channel allocation in accordance with various embodiments.

FIG. 11 illustrates a system 1100 that can be utilized in connection with adaptive uplink pilot multiplexing schemes as described herein. System 1100 comprises a receiver 1102 that receives a signal from, for instance, one or more receive antennas, and performs typical actions thereon (e.g., filters, amplifies, downconverts, . . . ) the received signal and digitizes the conditioned signal to obtain samples. A demodulator 1104 can demodulate and provide received pilot symbols to a processor 1106 for channel estimation.

Processor 1106 can be a processor dedicated to analyzing information received by receiver component 1102 and/or generating information for transmission by a transmitter 1114. Processor 1106 can be a processor that controls one or more portions of system 1100, and/or a processor that analyzes information received by receiver 1102, generates information for transmission by a transmitter 1114, and controls one or more portions of system 1100. System 1100 can include an optimization component 1108 that can optimize performance of user equipment before, during, and/or after performance of measurements with respect to one or more technologies and/or frequencies. Optimization component 1108 can be incorporated into the processor 1106. It is to be appreciated that optimization component 1108 can include optimization code that performs utility based analysis in connection with requesting measurement gaps. The optimization code can utilize artificial intelligence based methods in connection with performing inference and/or probabilistic determinations and/or statistical-based determination in connection with encoding and decoding schemes.

System (user equipment) 1100 can additionally comprise memory 1110 that is operatively coupled to processor 1106 and that stores information such as measurement gap information, scheduling information, and the like, wherein such information can be employed in connection with allocating requesting measurement gaps and performing measurements during a measurement gap. Memory 1110 can additionally store protocols associated with generating lookup tables, etc., such that system 1100 can employ stored protocols and/or algorithms to increase system capacity. It will be appreciated that the data store (e.g., memories) components described herein can be either volatile memory or nonvolatile memory, or can include both volatile and nonvolatile memory. By way of illustration and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1110 is intended to comprise, without being limited to, these and any other suitable types of memory. Processor 1106 is connected to a symbol modulator 1112 and transmitter 1114 that transmits the modulated signal.

Figure 12:
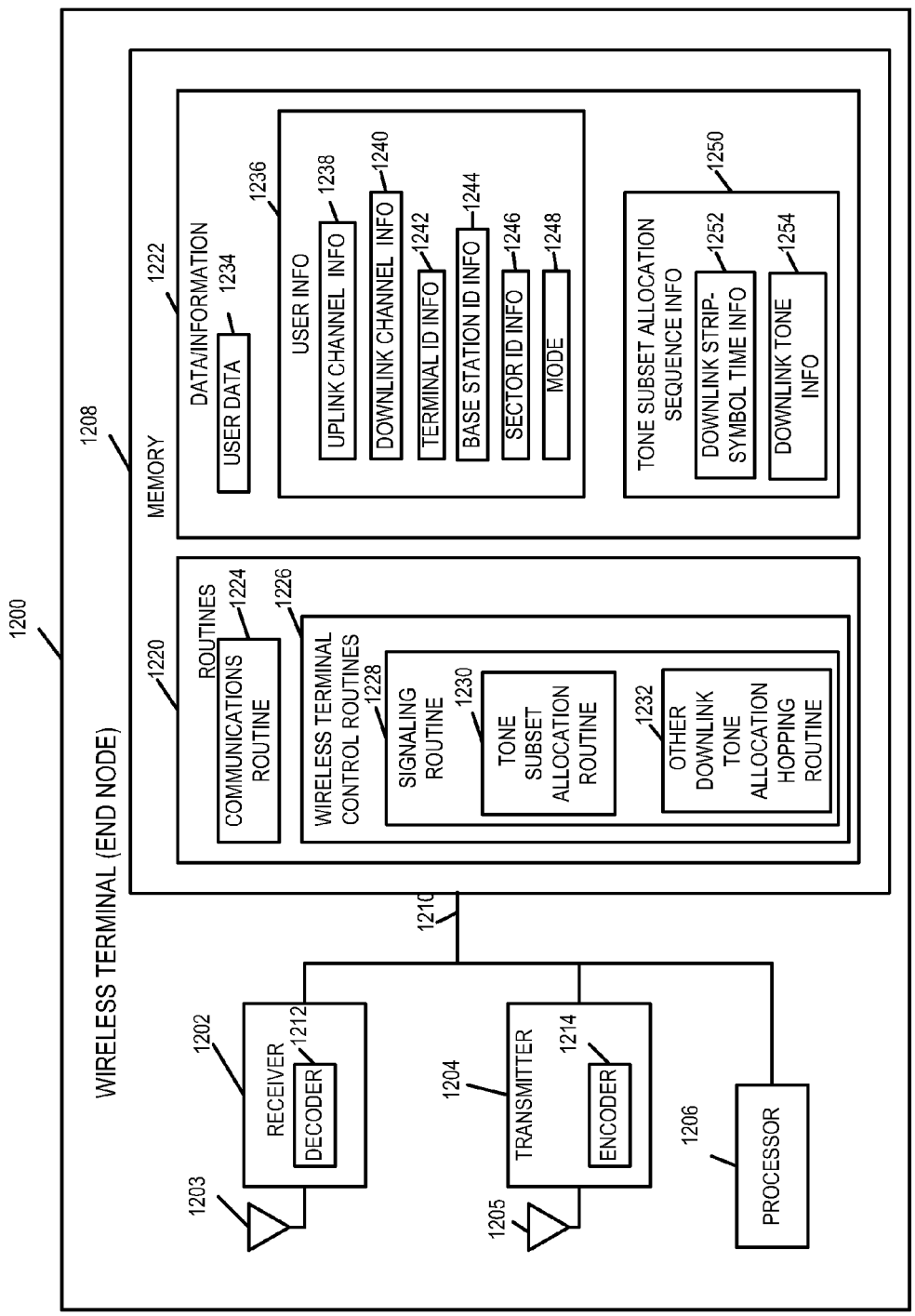
FIG. 12 illustrates an exemplary wireless terminal (e.g., wireless terminal, mobile device, end node, . . . ) implemented in accordance with various embodiments.

FIG. 12 illustrates an exemplary wireless terminal (e.g., end node, mobile device, . . . ) 1200 which can be used as any one of the wireless terminals (e.g., EN(1) 836, of the system 800 shown in FIG. 8). Wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. Antenna 1203 used for receiving signals from a base station is coupled to receiver 1202. Antenna 1205 used for transmitting signals, e.g., to a base station is coupled to transmitter 1204. As above, it is to be appreciated that various modifications are possible. For example, in a SU-MIMO system, multiple transmit and receive antennas, receivers, etc. in the base station and user equipment can be used. Similarly, for SDMA systems, multiple users can transmit and receive signals from a base station having multiple transmit and receive antennas, receivers, etc.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250, in the example case of an OFDMA communication system. User data 1234 can include data, intended for a peer node, which can be routed to encoder 1214 for encoding prior to transmission by transmitter 1204 to base station 1000, and data received from the base station 1000 which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by base station 1000 for wireless terminal 1200 to use when transmitting to the base station 1000. Uplink channels can include uplink traffic channels, dedicated uplink control channels, e.g., request channels, power control channels and timing control channels. In the example case of an OFDMA communication system, each uplink channel includes one or more logic tones, each logical tone following an uplink tone hopping sequence. In some embodiments, the uplink hopping sequences are different between each sector type of a cell and between adjacent cells.

Downlink channel information 1240 includes information identifying downlink channel segments that have been assigned by a base station to WT 1200 for use when the base station is transmitting data/information to WT 1200. Downlink channels can include downlink traffic channels and assignment channels, each downlink channel including one or more logical tone, each logical tone following a downlink hopping sequence, which is synchronized between each sector of the cell.

User info 1236 also includes terminal ID information 1242, which is a base station 1000 assigned identification, base station ID information 1244 which identifies the specific base station 1000 that WT has established communications with, and sector ID info 1246 which identifies the specific sector of the cell where WT 1200 is presently located. In an example OFDMA communication system, base station ID 1244 provides a cell slope value and sector ID info 1246 provides a sector index type; the cell slope value and sector index type can be used to derive tone hopping sequences. Mode information 1248 also included in user info 1236 identifies whether the WT 1200 is in sleep mode, hold mode, or on mode.

In some OFDMA embodiments, tone subset allocation sequence information 1250 includes downlink strip-symbol time information 1252 and downlink tone information 1254. Downlink tone info 1254 includes information including a carrier frequency assigned to the base station 1000, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. In some OFDMA embodiments, tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some embodiments and process received data transmitted from base station 1000.

The techniques of some embodiments can be implemented using software, hardware and/or a combination of software and hardware. Some embodiments are directed to an apparatus, e.g., a mobile node such as a mobile terminal, a base station, or a communications system which implement some embodiments. Some embodiments are also directed to methods, e.g., method of controlling and/or operating mobile nodes, base stations and/or communications systems, e.g., hosts, in accordance with some embodiments. Some embodiments are also directed to machine readable medium, e.g., ROM, RAM, CDs, hard discs, etc., which include machine readable instructions for controlling a machine to implement one or more steps in accordance with some embodiments.

In various embodiments nodes described herein are implemented using one or more modules to perform the steps corresponding to one or more methods of some embodiments, for example, signal processing, message generation and/or transmission steps. Thus, in some embodiments various features of some embodiments are implemented using modules. Such modules can be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, some embodiments are directed to a machine-readable medium including machine executable instructions for causing a machine, e.g., processor and associated hardware, to perform one or more of the steps of the above-described method(s).

Numerous additional variations on the methods and apparatus of some embodiments described above will be apparent to those skilled in the art in view of the above description of some embodiments. Such variations are to be considered within the scope of the respective embodiments. The methods and apparatus of some embodiments can be, and in various embodiments are, used with CDMA, orthogonal frequency division multiplexing (OFDM), SC-FDMA, and/or various other types of communications techniques which can be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of some embodiments.

It will be appreciated that, in accordance with one or more aspects described herein, inferences can be made regarding determining uplink pilot channel information. As used herein, the term to "infer" or "inference" refers generally to the process of reasoning about or inferring states of the system, environment, and/or user, mobile device, active uplink streams, and base station from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining active uplink streams to facilitate adaptive uplink pilot multiplexing. In accordance with another example, an inference may be made related to estimating a probability of a desired signal being differentiable from one or more undesired signals based on a set of uplink pilot signals. It will be appreciated that the foregoing examples are illustrative in nature and are not intended to limit the number of inferences that can be made or the manner in which such inferences are made in conjunction with the various embodiments and/or methods described herein.

Figure 13:
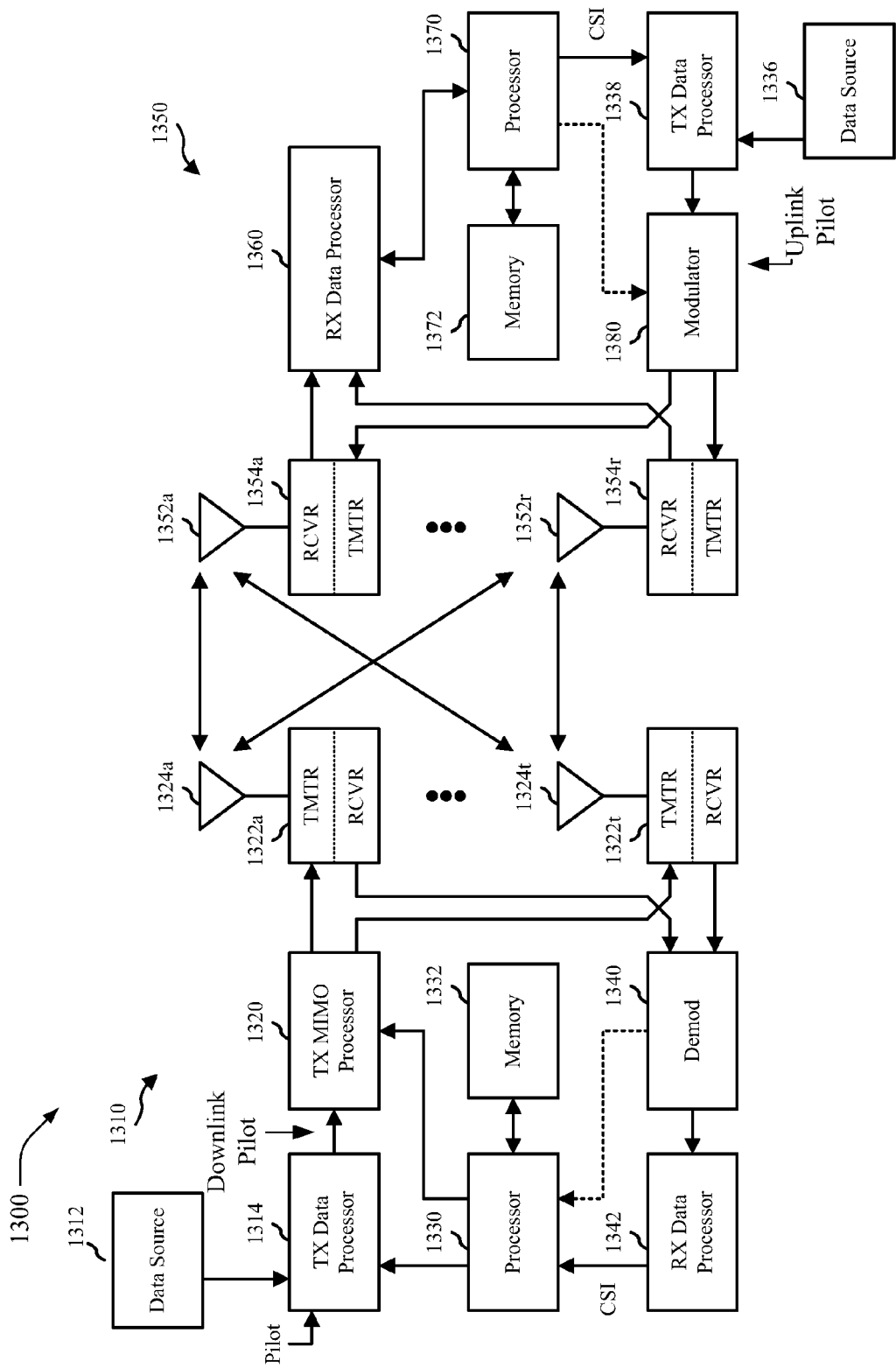
FIG. 13 illustrates an exemplary non-limiting block diagram of a communication system incorporating uplink pilot multiplexing in accordance with various aspects of the invention.

FIG. 13 illustrates an exemplary non-limiting block diagram of a communication system incorporating adaptive uplink pilot multiplexing in accordance with various aspects of the invention, where a transmitter system 1310 (e.g., base station, access point, etc.) and a receiver system 1350 (access terminal, user equipment, mobile node, etc.) in a MIMO system 1300. At the transmitter system 1310, traffic data for a number of data streams is provided from a data source 1312 to a transmit (TX) data processor 1314. In an embodiment, each data stream is transmitted over a respective transmit antenna. TX data processor 1314 formats, codes, and interleaves the traffic data for each data stream based on a particular coding scheme selected for that data stream to provide coded data. In accordance with various embodiments of the invention, transmitter system 1310 facilitates adaptive pilot multiplexing schemes by transmitting to the receiver system 1350 uplink pilot channel information (e.g., number of active streams and/or indicated starting frequency location, number of available RBs, any combination thereof, and/or the like).

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1330.

The modulation symbols for all data streams are then provided to a TX MIMO processor 1320, which may further process the modulation symbols (e.g., for OFDM). TX MIMO processor 1320 then provides $N_T$ modulation symbol streams to $N_T$ transmitters (TMTR) 1322a through 1322t. In certain embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1322a through 1322t are then transmitted from $N_T$ antennas 1324a through 1324t, respectively.

At receiver system 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective received signal, digitizes the conditioned signal to provide samples, and further processes the samples to provide a corresponding "received" symbol stream.

An RX data processor 1360 then receives and processes the $N_R$ received symbol streams from $N_R$ receivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by RX data processor 1360 is complementary to that performed by TX MIMO processor 1320 and TX data processor 1314 at transmitter system 1310.

A processor 1370 periodically determines which pre-coding matrix to use as described above. Processor 1370 formulates a reverse link message comprising a matrix index portion and a rank value portion. The reverse link message may comprise various types of information regarding the communication link and/or the received data stream. In accordance with various aspects of the invention, in response to receiving respective uplink pilot channel information from transmitter system 1310, receiver system 1350 adaptively multiplexes pilots by varying the pilot channel bandwidth and frequency location in time according to a predetermined function of the number of active streams. The reverse link message is then processed by a TX data processor 1338, which also receives traffic data for a number of data streams from a data source 1336, modulated by a modulator 1380, conditioned by transmitters 1354a through 1354r, and transmitted back to transmitter system 1310.

At transmitter system 1310, the modulated signals from receiver system 1350 are received by antennas 1324, conditioned by receivers 1322, demodulated by a demodulator 1340, and processed by a RX data processor 1342 to extract the reverse link message transmitted by the receiver system 1350. Processor 1330 then determines which pre-coding matrix to use for determining the beamforming weights then processes the extracted message. According to various aspects of the invention, in response to receiving multiplexed pilots from receiver system 1350, transmitter system 1310, demultiplexes the multiplexed pilot channel according to the predetermined function and the respective uplink pilot channel information.

Figure 14:
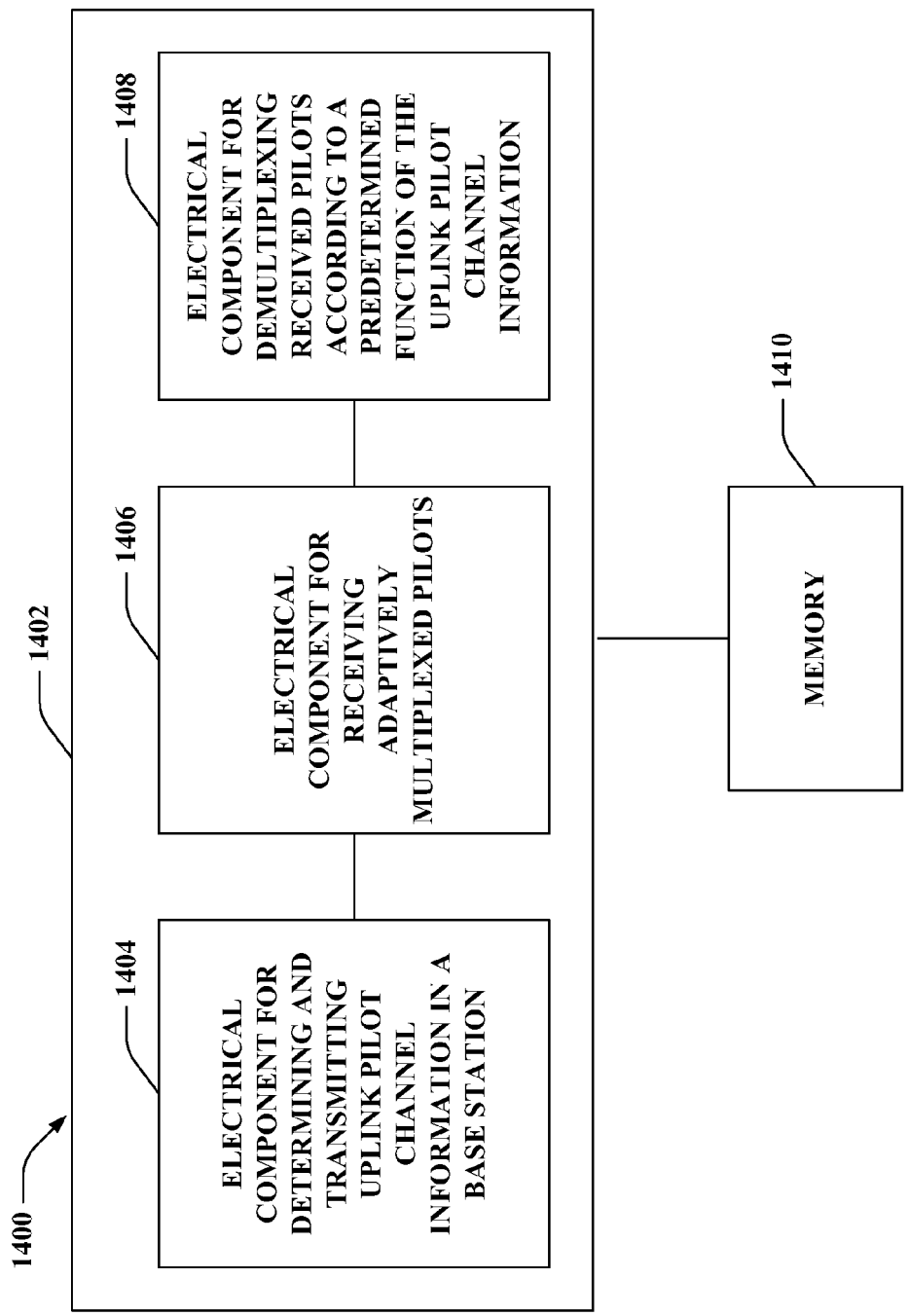
FIG. 14 illustrates an exemplary non-limiting apparatus that enables multiplexing uplink pilots according to various embodiments of the invention.

With reference to FIG. 14, illustrated is an apparatus 1400 that facilitates adaptive uplink pilot multiplexing according to various non-limiting embodiments of the invention. For example, apparatus 1400 may reside at least partially within a base station. It is to be appreciated that apparatus 1400 is represented as including functional blocks, which may be functional blocks that represent functions implemented by a processor, software, or combination thereof (e.g., firmware).

Apparatus 1400 includes a logical grouping 1402 of electrical components that can act in conjunction. For instance, logical grouping 1402 can include an electrical component for determining and transmitting uplink pilot channel information in a base station 1404. For the purposes of illustration and not limitation, uplink pilot channel information can include a number of one or more active streams to be multiplexed, a number of available resource blocks, and/or a pilot starting frequency position, any combination thereof, and the like. Further, logical grouping 1402 can include an electrical component for receiving adaptively multiplexed pilots 1406 as described in further detail supra in connection with FIG. 4, 6-7. Pursuant to an example, the multiplexed pilots can comprise pilots having varying pilot channel bandwidth and frequency location per block over time. In addition, the frequency location of the multiplexed pilots for each active stream can be cyclically shifted across the block to form a contiguous frequency block over time. Logical grouping 1402 can further include an electrical component for demultiplexing the received pilots according to a predetermined function of the uplink pilot channel information 1408. Additionally, logical grouping can include an electrical component (not shown) for frequency division multiplexing respective pilots per active stream in an orthogonal manner per block. Additionally, apparatus 1400 can include a memory 1410 that retains instructions for executing functions associated with electrical components 1404, 1406, and 1408. While shown as being external to memory 1410, it is to be understood that one or more of electrical components 1404, 1406, and 1408 may exist within memory 1410.

Figure 15:
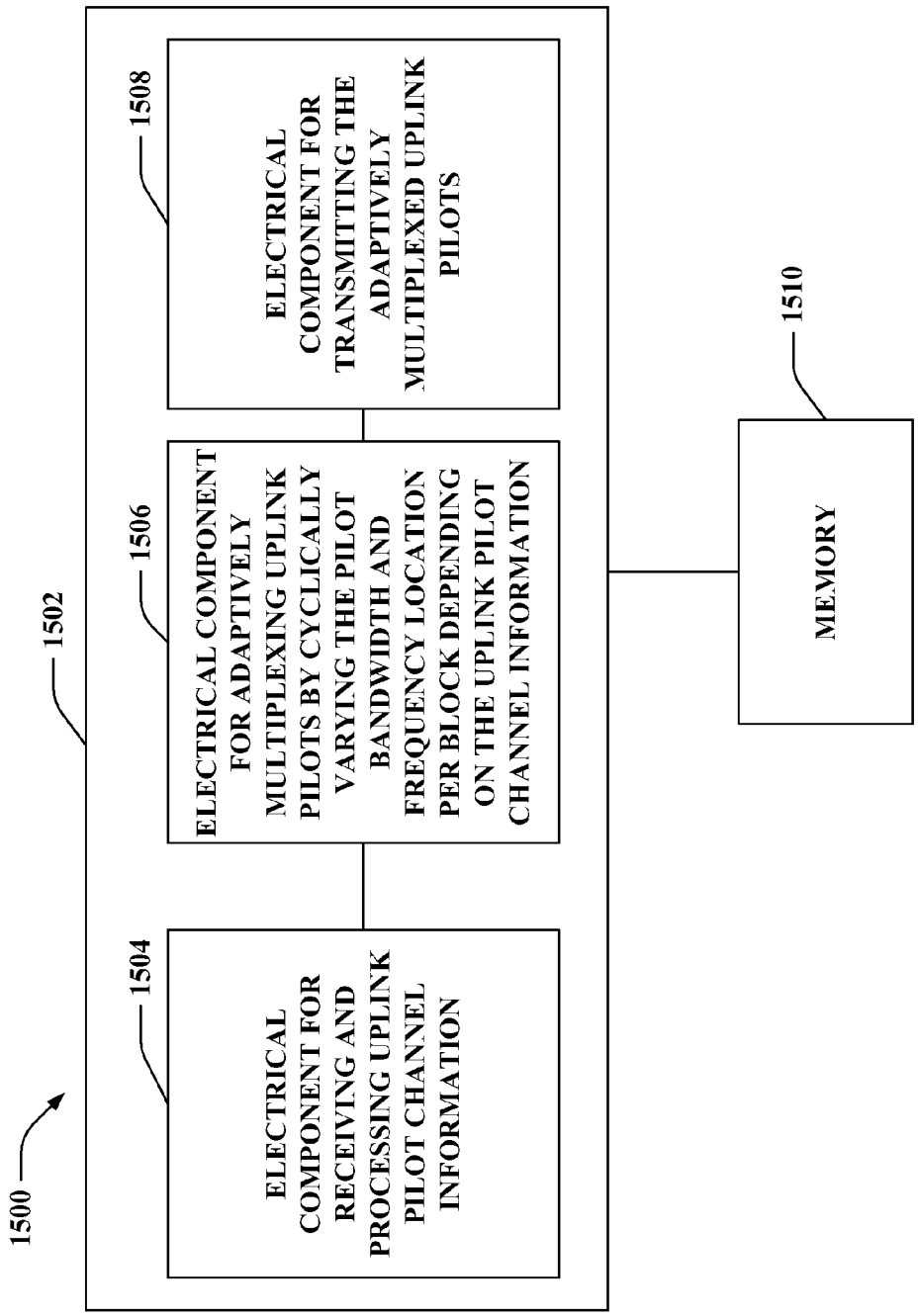
FIG. 15 illustrates an exemplary non-limiting apparatus that facilitates adaptive pilot multiplexing according to various embodiments of the invention.

With reference to FIG. 15, illustrated is an apparatus 1500 that enables adaptive uplink pilot multiplexing according to various non-limiting embodiments of the invention. Apparatus 1500 may reside at least partially within a wireless terminal, for instance. It is to be appreciated that apparatus 1500 is represented as including functional blocks, which may be functional blocks that represent functions implemented by a processor, software, or combination thereof (e.g., firmware). Apparatus 1500 includes a logical grouping 1502 of electrical components that can act in conjunction. For instance, logical grouping 1502 may include an electrical component for receiving and processing uplink pilot channel information 1504. For example, electrical component 1504 can include an electrical component for receiving and processing uplink pilot channel information as described above with respect to FIG. 14. Further, logical grouping 1502 can include an electrical component for adaptively multiplexing uplink pilots by cyclically varying the pilot bandwidth and frequency location per block depending on the uplink pilot channel information 1506 as described in further detail supra in connection with FIG. 4, 6-7. In addition, logical grouping 1502 can include an electrical component (not shown) for frequency division multiplexing uplink pilots per active stream in an orthogonal manner per block. Further, logical grouping 1402 can include an electrical component for transmitting the adaptively multiplexed uplink pilots 1508. For example, electrical component 1508 can include an electrical component for transmitting adaptively multiplexed pilots having varying pilot channel bandwidth and frequency location per short block. Additionally, apparatus 1500 may include a memory 1510 that retains instructions for executing functions associated with electrical components 1504, 1506, and 1508. While shown as being external to memory 1510, it is to be understood that one or more of electrical components 1504, 1506, and 1508 may exist within memory 1510.

It is to be understood that the embodiments described herein may be implemented by hardware, software, firmware, middleware, microcode, or any combination thereof. For a hardware implementation, the processing units within an user equipment or a network device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case it can be communicatively coupled to the processor through various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for pilot multiplexing in a wireless communication system, the method comprising:

determining uplink pilot channel information in a base station, the determining uplink pilot channel information including determining a number of one or more active streams to be multiplexed;

transmitting the uplink pilot channel information to one or more wireless terminals to facilitate multiplexing uplink pilots by varying, for each active stream, pilot channel bandwidth and frequency location per resource block over time within a transmission time interval according to a predetermined function of the uplink pilot channel information; and receiving and demultiplexing the multiplexed uplink pilots according to the predetermined function, wherein the frequency location of the multiplexed uplink pilots for each active stream is cyclically shifted across tones of the resource block over time within the transmission time interval to form a contiguous frequency block in each resource block.

2. The method of claim 1, the determining uplink pilot channel information includes determining a number of available resource blocks.

3. The method of claim 1, the determining uplink pilot channel information includes determining a starting frequency position.

4. A method for pilot multiplexing in a wireless communication system, the method comprising:
receiving uplink pilot channel information from a base station, the receiving uplink pilot channel information including receiving a number of one or more active streams to be multiplexed;
multiplexing uplink pilots by varying, for each active stream, pilot channel bandwidth and frequency location per resource block over time within a transmission time interval in a wireless terminal according to a predetermined function of the uplink pilot channel information; and
transmitting the uplink pilots,
wherein the frequency location of the multiplexed uplink pilots for each active stream is cyclically shifted across tones of the resource block over time within the transmission time interval to form a contiguous frequency block in each resource block.

5. The method of claim 4, the receiving uplink pilot channel information includes receiving a number of available resource blocks.

6. The method of claim 4, the receiving uplink pilot channel information includes receiving a starting frequency position.

7. The method of claim 4, the transmitting the uplink pilots includes transmitting the uplink pilots having varying pilot channel bandwidth and frequency location for each active stream per resource block.

8. The method of claim 4, the uplink pilots per active stream are frequency division multiplexed in an orthogonal manner per resource block.

9. A communications apparatus, comprising:
a memory that retains instructions for determining and transmitting uplink pilot channel information, receiving adaptively multiplexed pilots, and demultiplexing the received pilots according to a predetermined function of the uplink pilot channel information; and
a processor that is configured to execute the instructions within the memory,
wherein the instructions for determining and transmitting uplink pilot channel information further comprise instructions for determining a number of one or more active streams to be multiplexed.
wherein the adaptively multiplexed pilots comprise pilots having, for each active stream, varying pilot channel bandwidth and frequency location per resource block over time within a transmission time interval, and
wherein the frequency location of the multiplexed pilots for each active stream is cyclically shifted across tones of the resource block over time within the transmission time interval to form a contiguous frequency block in each resource block.

10. The communications apparatus of claim 9, wherein the instructions for determining uplink pilot channel information further comprise instructions for determining a number of available resource blocks, and a starting frequency position.

11. A communications apparatus, comprising:
a memory that retains instructions for receiving and processing uplink pilot channel information, adaptively multiplexing pilots by cyclically varying, for each active stream, the pilot channel bandwidth and frequency location per resource block over time within a transmission time interval based on the uplink pilot channel information, and transmitting the adaptively multiplexed pilots; and
a processor that is configured to execute the instructions within the memory,
wherein the instructions for receiving and processing uplink pilot channel information further comprise instructions for receiving and processing a number of one or more active streams to be multiplexed, and
wherein the frequency location of the multiplexed pilots for each active stream is cyclically shifted across tones of the resource block over time within the transmission time interval to form a contiguous frequency block in each resource block.

12. The communications apparatus of claim 11, wherein the instructions for receiving and processing uplink pilot channel information further comprise instructions for receiving and processing a number of available resource blocks, and a pilot channel starting frequency position.

13. The communications apparatus of claim 11, wherein the instructions for transmitting further comprise instructions for transmitting adaptively multiplexed pilots having varying pilot channel bandwidth and frequency location for each active stream per resource block.

14. The communications apparatus of claim 11, wherein the instructions for adaptively multiplexing pilots includes instructions for frequency division multiplexing uplink pilots per active stream in an orthogonal manner per resource block.

15. A communications apparatus, comprising:
means for determining uplink pilot channel information in a base station, wherein the uplink pilot channel information includes a number of one or more active streams to be multiplexed;
means for transmitting the uplink pilot channel information;
means for receiving adaptively multiplexed pilots; and
means for demultiplexing the received pilots according to a predetermined function of the uplink pilot channel information,
wherein the adaptively multiplexed pilots comprise pilots having, for each active stream, varying pilot channel bandwidth and frequency location per resource block over time within a transmission time interval, and
wherein the frequency location of the multiplexed pilots for each active stream is cyclically shifted across tones of the resource block over time within the transmission time interval to form a contiguous frequency block in each resource block.

16. The communications apparatus of claim 15, wherein the uplink pilot channel information includes at least one of a number of available resource blocks, and a pilot starting frequency position.

17. The communications apparatus of claim 15, further comprising means for frequency division multiplexing respective pilots per active stream in an orthogonal manner per resource block.

18. A communications apparatus, comprising:
means for receiving and processing uplink pilot channel information;
means for adaptively multiplexing uplink pilots by cyclically varying, for each active stream, the pilot channel bandwidth and frequency location per resource block over time within a transmission time interval depending on the uplink pilot channel information; and
means for transmitting the adaptively multiplexed uplink pilots,
wherein the means for receiving and processing uplink pilot channel information further includes means for receiving and processing a number of one or more active streams to be multiplexed, and
wherein the frequency location of the multiplexed pilots for each active stream is cyclically shifted across tones of the resource block over time within the transmission time interval to form a contiguous frequency block in each resource block.

19. The communications apparatus of claim 18, wherein the means for receiving and processing uplink pilot channel information further includes means for receiving and processing at least one of a number of available resource blocks, and a pilot channel starting frequency position.

20. The communications apparatus of claim 18, wherein the means for transmitting include means for transmitting adaptively multiplexed pilots having varying pilot channel bandwidth and frequency location for each active stream per resource block.

21. The communications apparatus of claim 18, wherein the means for adaptively multiplexing pilots includes means for frequency division multiplexing uplink pilots per active stream in an orthogonal manner per resource block.

22. A non-transitory machine-readable medium having computer-executable instructions stored thereon for:
  determining a number of one or more active streams to be multiplexed,
  determining and transmitting uplink pilot channel information, receiving adaptively multiplexed pilots, and demultiplexing the received pilots according to a predetermined function of the uplink pilot channel information,
  wherein the adaptively multiplexed pilots comprise pilots having, for each active stream, varying pilot channel bandwidth and frequency location per resource block over time within a transmission time interval, and
  demultiplexing the received pilots having a cyclically shifted frequency location across tones of the resource block over time within the transmission time interval for each active stream.

23. The non-transitory machine-readable medium of claim 22, further comprising computer-executable instructions stored thereon for demultiplexing the received pilots having varying pilot channel bandwidth and frequency location for each active stream per resource block over time within the transmission time interval.

24. The non-transitory machine-readable medium of claim 22, further comprising computer-executable instructions stored thereon for determining one of a number of available resource blocks, and a starting frequency position.

25. A non-transitory machine-readable medium having computer-executable instructions stored thereon for:
  receiving and processing uplink pilot channel information;
  receiving, and processing a number of one or more active streams to be multiplexed;
  adaptively multiplexing pilots by regularly varying, for each active stream, the pilot channel bandwidth and frequency location per resource block over time within a transmission time interval based on the uplink pilot channel information; and
  transmitting the adaptively multiplexed pilots,
  wherein the frequency location of the multiplexed pilots for each active stream is cyclically shifted across tones of the resource block over time within the transmission time interval to form a contiguous frequency block in each resource block.

26. The non-transitory machine-readable medium of claim 25, further comprising computer-executable instructions stored thereon for receiving and processing at least one of a number of available resource blocks, and a pilot channel starting frequency position.

27. The non-transitory machine-readable medium of claim 25, further comprising computer-executable instructions stored thereon for transmitting adaptively multiplexed pilots having varying pilot channel bandwidth and frequency location for each active stream per resource block.

28. The non-transitory machine-readable medium of claim 25, further comprising computer-executable instructions stored thereon for frequency division multiplexing uplink pilots per active stream orthogonally per resource block.

29. In a wireless communication system, an apparatus comprising:
  a processor configured to:
    determine uplink pilot channel information in a base station, the uplink pilot channel information including a number of one or more active streams to be multiplexed;
    transmit the uplink pilot channel information to one or more wireless terminals to facilitate multiplexing uplink pilots by varying, for each active stream, pilot channel bandwidth and frequency location per resource block over time within a transmission time interval according to a predetermined function of the uplink pilot channel information; and
    receive and demultiplex the multiplexed uplink pilots according to the predetermined function,
  wherein the frequency location of the multiplexed pilots for each active stream is cyclically shifted across tones of the resource block over time within the transmission time interval to form a contiguous frequency block in each resource block.

30. The communications apparatus of claim 29, wherein the multiplexed pilots include pilots having, for each active stream, varying pilot channel bandwidth and frequency location per resource block over time within the transmission time interval.

31. The communications apparatus of claim 29, wherein the uplink pilot channel information includes at least one of a number of available resource blocks, and a starting frequency position.

32. In a wireless communication system; an apparatus comprising:
  a processor configured to:
    receive uplink pilot channel information from a base station;
    receive and process a number of one or more active streams to be multiplexed;
    multiplex uplink pilots by varying, for each active stream, pilot channel bandwidth and frequency location per resource block over time within a transmission time interval in a wireless terminal according to a predetermined function of the uplink pilot channel information; and
    transmit the uplink pilots,
  wherein the frequency location of the multiplexed pilots for each active stream is cyclically shifted across tones of the resource block over time within the transmission time interval to form a contiguous frequency block in each resource block.

33. The communications apparatus of claim 32, wherein the processor is further configured to receive and process at least one of a number of available resource blocks, and a pilot channel starting frequency position.

34. The communications apparatus of claim 32, wherein the processor is further configured to transmit adaptively multiplexed pilots having varying pilot channel bandwidth and frequency location for each active stream per resource block.

35. The communications apparatus of claim 32, wherein the processor is further configured to frequency division multiplex uplink pilots per active stream in an orthogonal manner per resource block.

* * * * *